US009858544B2

(12) United States Patent
Balasubramanian et al.

(10) Patent No.: US 9,858,544 B2
(45) Date of Patent: *Jan. 2, 2018

(54) EXPERT EXCHANGE DURING UML DESIGN UPDATES

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Cary, NC (US); Agueda Martinez Hernandez Magro, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/730,931

(22) Filed: Jun. 4, 2015

(65) Prior Publication Data

US 2015/0324731 A1    Nov. 12, 2015

Related U.S. Application Data

(63) Continuation of application No. 14/270,820, filed on May 6, 2014, now Pat. No. 9,104,997.

(51) Int. Cl.
*G06F 9/44* (2006.01)
*G06Q 10/06* (2012.01)
*G06Q 50/00* (2012.01)

(52) U.S. Cl.
CPC ....... *G06Q 10/063118* (2013.01); *G06F 8/10* (2013.01); *G06F 8/20* (2013.01);
(Continued)

(58) Field of Classification Search
None
See application file for complete search history.

(56) References Cited

U.S. PATENT DOCUMENTS 7,051,071 B2   5/2006  Stewart et al.
8,214,240 B1   7/2012  Morris et al.
(Continued)

OTHER PUBLICATIONS

List of IBM Patents or Patent Applications Treated as Related.
Office Action dated Mar. 9, 2017, received in a related U.S. Appl. No. 14/730,998.

*Primary Examiner* — Chuck Kendall
(74) *Attorney, Agent, or Firm* — Scully, Scott, Murphy & Presser, P.C.; Kurt P. Goudy, Esq.

(57) ABSTRACT

A system and computer program product to enable software architects to optimally select resources to enhance reused or previously developed components of a UML model. During a UML design phase, if a component is detected to be an enhancement of a previously developed component, the system implement methods determining if the resource who developed the component previously is available for assignment. If available, the resource is selected as the optimal candidate. If unavailable, the system and methods look at several factors to determine if reassignment of resource is possible. These factors implement: a Keyword/Requirement Assignment; a Component History Detection or a Component Update History detection where a keyword triggers a search for developers who worked on a previous version; a Repository History where absence of a keyword triggers a search in component repositories for a component development history, and associated developers. After component developers are identified, their current availability is determined.

20 Claims, 16 Drawing Sheets

(52) U.S. Cl.
CPC .............. *G06F 8/71* (2013.01); *G06Q 10/06* (2013.01); *G06Q 10/063112* (2013.01); *G06Q 50/01* (2013.01)

(56) References Cited

U.S. PATENT DOCUMENTS

| | | |
|---|---|---|
| 8,234,143 B1 | 7/2012 | Brewer et al. |
| 9,104,997 B1 | 8/2015 | Balasubramanian |
| 2006/0101435 A1 | 5/2006 | Akilov et al. |
| 2009/0150855 A1 | 6/2009 | Elaasar |
| 2010/0153908 A1* | 6/2010 | Sarkar .................... G06Q 99/00 717/104 |
| 2011/0099536 A1 | 4/2011 | Coldicott et al. |
| 2013/0246110 A1 | 9/2013 | Nakhayi Ashtiani et al. |
| 2014/0019933 A1 | 1/2014 | Balasubramanian et al. |

* cited by examiner

1000

COMPONENT: USER AUTHENTICATION MODULE ~1012

STEREOTYPES:
AUTHENTICATION (PROPERTIES: CLIENT:JAVA;
AUTH-METHOD:WEBSERVICES; SECURITY:HTTPS)    } 1015
PROG-LANG (PROPERTIES: LANG:JAVA; VERSION:1.5)

DEVELOPERS (PROPERTIES:
VERSION:1.0|DEVELOPER1@COMP.COM,DEVELOPER
2@COMP.COM;
} 1018
VERSION:2.0IDVELOPER1@COMP.COM,DEVELOPER
3@COMP.COM)

KEYWORDS: UPDATE, CORPORATE_DIRECTORY,
WEB SERVICES, SSO, SINGLESIGNON, WSRR } 1020

COMMENTS:
    REQ01.01 : THE SYSTEM SHALL
AUTHENTICATE THE USER AGAINST THE CORPORATE
DIRECTORY.;

REQ01.02 : THE SYSTEM SHALL NOT } 1023
REQUIRE RE-AUTHENTICATION IF THE USER HAS
ALREADY BEEN AUTHENTICATED PREVIOUSLY.

COMPONENT: USER AUTHENTICATION MODULE

STEREOTYPES: —╱⁻1112
1115 —╱ AUTHENTICATION (PROPERTIES: ╱⁻1120
CLIENT:JAVA|CLIENT:JAVASCRIPT;
AUTH-METHOD:WEBSERVICES | REST; SECURITY:HTTPS)
1125 —╱ PROG-LANG (PROPERTIES: LANG:JAVA | LANG:JAVASCRIPT;
VERSION:1.5 | OAUTH:2.0)

KEYWORDS: CORPORATE_DIRECTORY, WEB SERVICES, SSO,
SINGLESIGNON, WSRR,
FACEBOOK, OAUTH —╲ 1135 ⎫⎬⎭ 1130

COMMENTS:
  REQ01.01 THE SYSTEM SHALL AUTHENTICATE THE USER AGAINST THE CORPORATE DIRECTORY.;
  REQ01.02 THE SYSTEM SHALL NOT REQUIRE RE-AUTHENTICATION IF THE USER HAS ALREADY BEEN AUTHENTICATED PREVIOUSLY.;
  CR01.01 THE SYSTEM SHALL ALLOW ALTERNATE AUTHENTICATION OF THE USER USING FACEBOOK. ⎫⎬⎭ 1150

FIG. 6

EXPERT EXCHANGE DURING UML DESIGN UPDATES

CROSS-REFERENCE TO RELATED APPLICATION

The present disclosure is a continuation of commonly-owned, co-pending U.S. patent application Ser. No. 14/270,820 filed May 6, 2014. The present disclosure further relates to commonly-owned, co-pending U.S. patent application Ser. No. 13/546,301 filed Jul. 11, 2012 entitled "SELECTING A DEVELOPMENT ASSOCIATE FOR WORK IN A UNIFIED MODELING LANGUAGE (UML) ENVIRONMENT" the whole contents and disclosure of which are incorporated by reference as if fully set forth herein.

BACKGROUND

The disclosure relates to systems and methods making use of software design visualization tools, e.g., UML (Unified Modeling Language) diagrams, for the selection of development resources during a design phase by detecting and using a design component history.

The Unified Modeling Language is used to specify, visualize, modify, construct and document the artifacts of a software-intensive system under development. UML offers a standard way to visualize a system's architectural blueprints, including elements such as: activities, actors, business processes, database schemas, (logical) components, programming language statements, reusable software components.

UML combines techniques from data modeling (entity relationship diagrams), business modeling (work flows), object modeling, and component modeling. It can be used with all processes, throughout a software development life cycle, and across different implementation technologies. UML has synthesized the notations of the Booch method, the Object-modeling technique (OMT) and Object-oriented software engineering (DOSE) by fusing them into a single, common and widely usable modeling language. UML aims to be a standard modeling language which can model concurrent and distributed systems. UML is a de facto industry standard, and is evolving under the auspices of the Object Management Group (OMG). UML models may be automatically transformed to other representations (e.g. Java) by means of QVT-like transformation languages. UML is extensible, with two mechanisms for customization: profiles and stereotypes.

Further, Rational Software Architect, (RSA) made by current assignee International Business Machines incorporated (IBM's Rational Software division), is a comprehensive modeling and development environment that uses the Unified Modeling Language (UML) for designing architecture for C++ and Java 2 Enterprise Edition (J2EE) applications and web services. Rational Software Architect is built on the Eclipse open-source software framework and includes capabilities focused on architectural code analysis, C++, and model-driven development (MDD) with the UML for creating resilient applications and web services.

However, within large complex systems, it is common for architectural components to evolve as functions are added or enhanced. These components may have been developed during an earlier release. Alternatively, they may be reused from other systems or from component repositories. In either case, it is advantageous to retain the resources (e.g., software developers) that developed these components. However with a highly dynamic staffing model, it is difficult to retain resources even when additional enhancements are anticipated.

What is needed is a system and method to assist in optimal staffing as components evolve or are reused.

Moreover, a development project goes through a number of phases before it is delivered. While the phases differ in scope and purpose based on the method chosen, a typical project is executed through analysis, design, development and testing. The architecture model established early in the analysis phase continuously evolves through the phases. During this evolution process as assumptions and decisions are elaborated, the initial model often undergoes change. Previously identified components may no longer be needed, component responsibilities may be changed or new components may be needed. As these changes occur, the skill set needed to execute the project also changes. Presently, it is difficult to continuously adjust the staffing model to reach optimal staffing. The process is manual and tedious. It would be desirable to provide methods to optimize development resource selection based on architecture models.

Further methods are needed to continuously evaluate the architecture model against assigned resources, and take reassignment steps as soon as a change is detected.

Further, when development resource skills do not exactly match the needs specified by the architecture model, methods are needed to automatically generate a lesson plan for the development resources so that they may increase their skills.

SUMMARY

This disclosure provides a computer-implemented system and method for selecting resources for building a Unified Modeling Language (UML) model associated with a software development project during its design.

In one aspect, there is provided a system for selecting resources for building a software development project during its design. The system comprises: a memory storage device; a hardware processor in communication with the memory storage device and configured to: automatically detect a change in a software architecture model being built, the detected change comprising one of: an addition of a new element, a deletion of an element in the software architecture model or a change to an existing element of the software architecture model, and evaluate, upon the detection, each detected change against a currently assigned resource skill set for resources used in developing the software architecture model, and one or more of: automatically determine a developer resource candidate of developer resources currently associated with the project to removed upon evaluating a deletion of an element in the software architecture model; or automatically determine an existing developer resource candidate to take on additional work upon evaluating an addition or update of an element in the software architecture model; or automatically locate a new developer resource if no existing developer resource can take on the additional work.

In a further aspect, a computer program product is provided for performing operations. The computer program product includes a storage medium readable by a processing circuit and storing instructions run by the processing circuit for running a method. The method is the same as listed above.

BRIEF DESCRIPTION OF DRAWINGS

Embodiments will now be described by way of non-limiting examples with reference to the following figures:

FIG. 3 shows an example 1000 depicting a software architect designing UML updates to an example UML element;

FIG. 6 shows an example 1100 depicting a software architect designing further UML updates to the example UML element of FIG. 3;

DETAILED DESCRIPTION

In embodiments described herein, the system and method makes use of a related commonly-owned, co-pending U.S. patent application Ser. No. 13/546,301 entitled "Services Delivery Optimization through UML Diagramming With Domain Expertise Selection" that describes methods to optimize development resource selection.

Generally, the systems and methods described herein enhance the co-pending application Ser. No. 13/546,301 such that given a UML model, the methods look at the model and extract information from the model, including: keyword associated with components, stereotypes and relationships, etc., and this information is indexed and stored in various databases.

Figure 1:
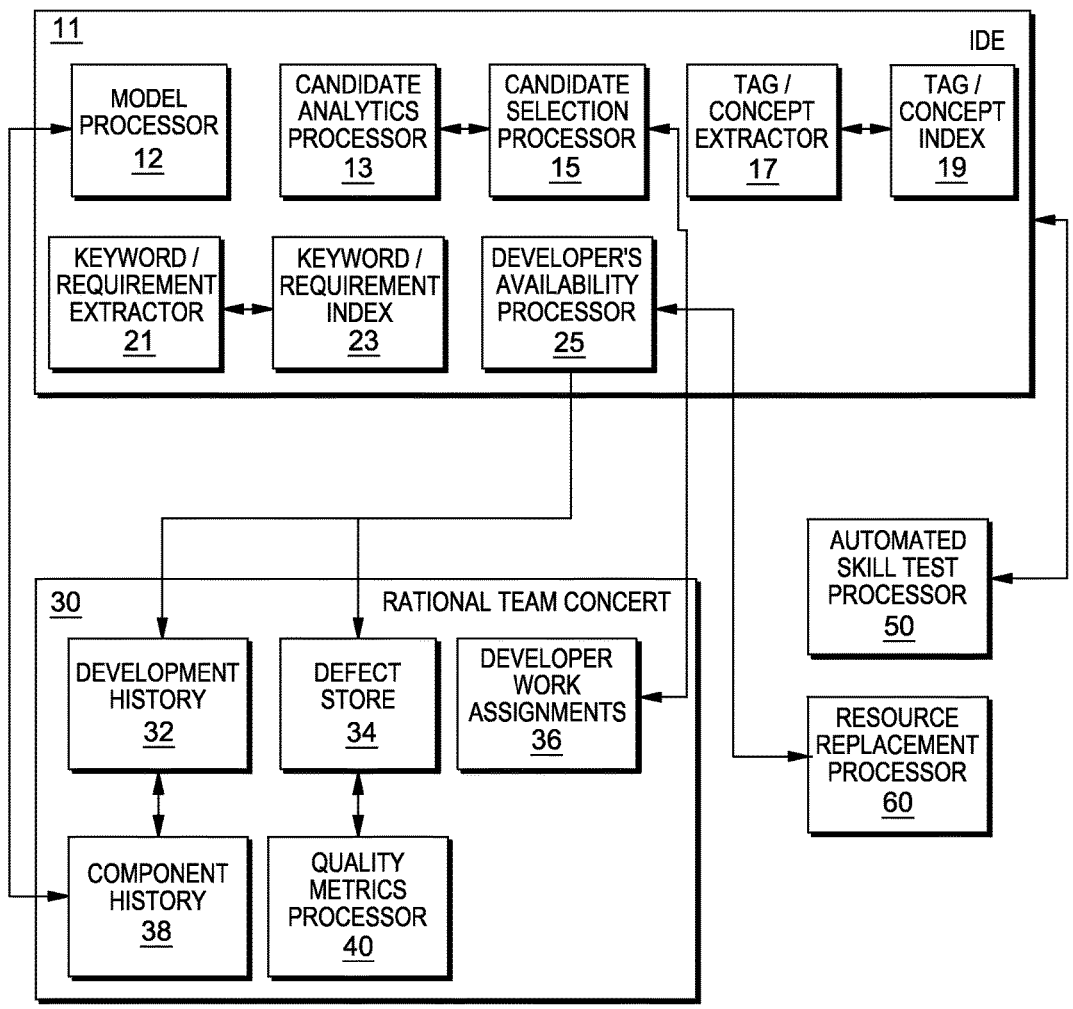
FIG. 1 shows a schematic of an exemplary computing environment 10 according to illustrative embodiments of the present invention.

In one aspect, there is input to the system, e.g., a computing system such as shown in FIG. 1, an Architecture Model Specification. The UML permits the architectural model of the system being developed to be specified at various levels of detail. Commonly developed models include, but are not limited to: a system context, an architecture overview, an analysis (platform independent) and an enterprise design (platform specific). In an embodiment, the software architect develops a UML model of UML elements including, but not limited to: components, component associations (structural view), component interactions (behavioral view) and component deployment (operational view).

In one embodiment, for a UML model build, such as specified according to a current version UML 2.0, incorporated herein by reference, there are three defined diagramming model types capable of design by the software architect. 1) Models that represent static application structure; 2) Models that represent general types of behavior; and 3) Models that represent different aspects of interactions. For example, Structure Diagram types may include: the Class Diagram, Object Diagram, Component Diagram, a Composite Structure Diagram, Package Diagram, and a Deployment Diagram. Behavior Diagrams include a Use Case Diagram including: an Activity Diagram, and State Machine Diagram. Interaction Diagrams are types that may be derived from the more general Behavior Diagram and include a Sequence Diagram, a Communication diagram, a Timing diagram, and an Interaction Overview diagram.

In one aspect, the present systems and methods enables software architects to optimally select resources when there is re-use of an UML element (e.g., a component), or when a UML element (e.g., component) has been previously developed. For example, during the UML model design phase when the model is being built, if a component is automatically detected to be an enhancement to what was previously developed, the methods implemented: determines if the resource who previously wrote the code for that component is available for that assignment. If available, the method selects that resource (developer) as an optimal candidate. For example, looking at a component history and finding that it has developed over time; then the developer who most recently worked on the component may be given precedent to work on the component. If determined that the resource is not available, the method determines whether another resource is suitable, i.e., whether a re-assignment to another resource is possible.

Further to this aspect, if determined that the original developer resource is available, however, has been working on another software development project, then the method further determines a suitable replacement resource for that developer resource that is suitable for that other software development project.

It should be noted that while the developer resource being selected would be for software development, it is understood that software development may be include UML model design, however, may also include other activities such as coding, Question/Answer, testing, documentation, etc.

Thus, the teachings herein provide many advantages including but not limited to: (1) reuse of resource(s) who already has(have) the required domain knowledge resulting in optimal execution; (2) higher quality software products; (3) reduced management overhead; and (4) provide efficient staffing.

The system implementing processing methods described herein is now shown with respect of FIG. 1 depicting a computer system 10. As part of computer system 10 is an Integrated Development Environment 11, and a (UML) Modeling version control system 30 that, in one embodiment, may include IBM's Rational® Team Concert product ("Rational") (Trademark of International Business Machines, Inc., Armonk N.Y.)) that may additionally include an IBM Rational® Software Architect (RSA), e.g., RSA v.7.5.4 and a Rational Team Concert ("RTC") such as IBM's Rational® Team Concert client 2.0 plug-in with IBM Rational® Application Developer or IBM Rational Software Architect. Additionally, system 10 includes an Automated Skill Test Processor 50, and a Resource Replacement processor device 60 implementing method steps as described herein below. It should be understood that processor devices implemented in system 10 of FIG. 1 may include a bus, and device interfaces facilitating communication among the components shown.

It is understood that system 10 could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 10 could be deployed, managed, serviced, etc., by a service provider who offers to implement, deploy, and/or perform the functions of the present invention for others.

Computer system 10 is intended to represent any type of computer system that may be implemented in deploying/realizing the teachings recited herein. In one embodiment, computer system 10 represents an illustrative system for enabling software architects to optimally select resources (e.g., a programmer or developer resource) to enhance reused or previously developed components.

Further, the system 10 provides the ability to develop UML models and capture updates to an existing system. For example, an existing model may be updated with refinements needed for a future release. Alternately, a new architecture model may be developed that references elements of an existing model. The system will detect model architecture changes and ensure the most optimal staffing for developing.

In one embodiment, as shown in FIG. 1, system 10 includes a model hardware processor 12 that executes computer program code to process changes in a UML model by implementing a Keyword/Requirement Extractor component 21 and a Source Repository (e.g., RTC) 30 uses the Component History 38 to process changes in a UML model. Further, a candidate analytics processor device 13 analyzes information from a candidate selection processor 15, which gets updates from the developer work assignments component 36 from the version control provided by Rational Team Concert sub-system 30. As further shown in FIG. 1, a Tag/Concept Extractor 17 uses a Tag/Concept Index 19 component from the IDE to assign tags.

System 10 further includes a Developer's Availability Processor module 25 that uses a development history store 32 and defect store 34 and quality metrics from a Quality Metrics processor module or unit 40 implementing programmed code to determine a developer's ranking based on what the developer has been working on including defects. Developer Work Assignments 36 use the Candidate Selection Processor 15 to determine if the developer can be assigned in which case, a Resource Replacement Processor module 60 is used to determine another developer to replace the component developer. When no developer is available, IDE 11 uses an Automated Skill Test Processor 50, to find potential candidates.

Figure 2A:
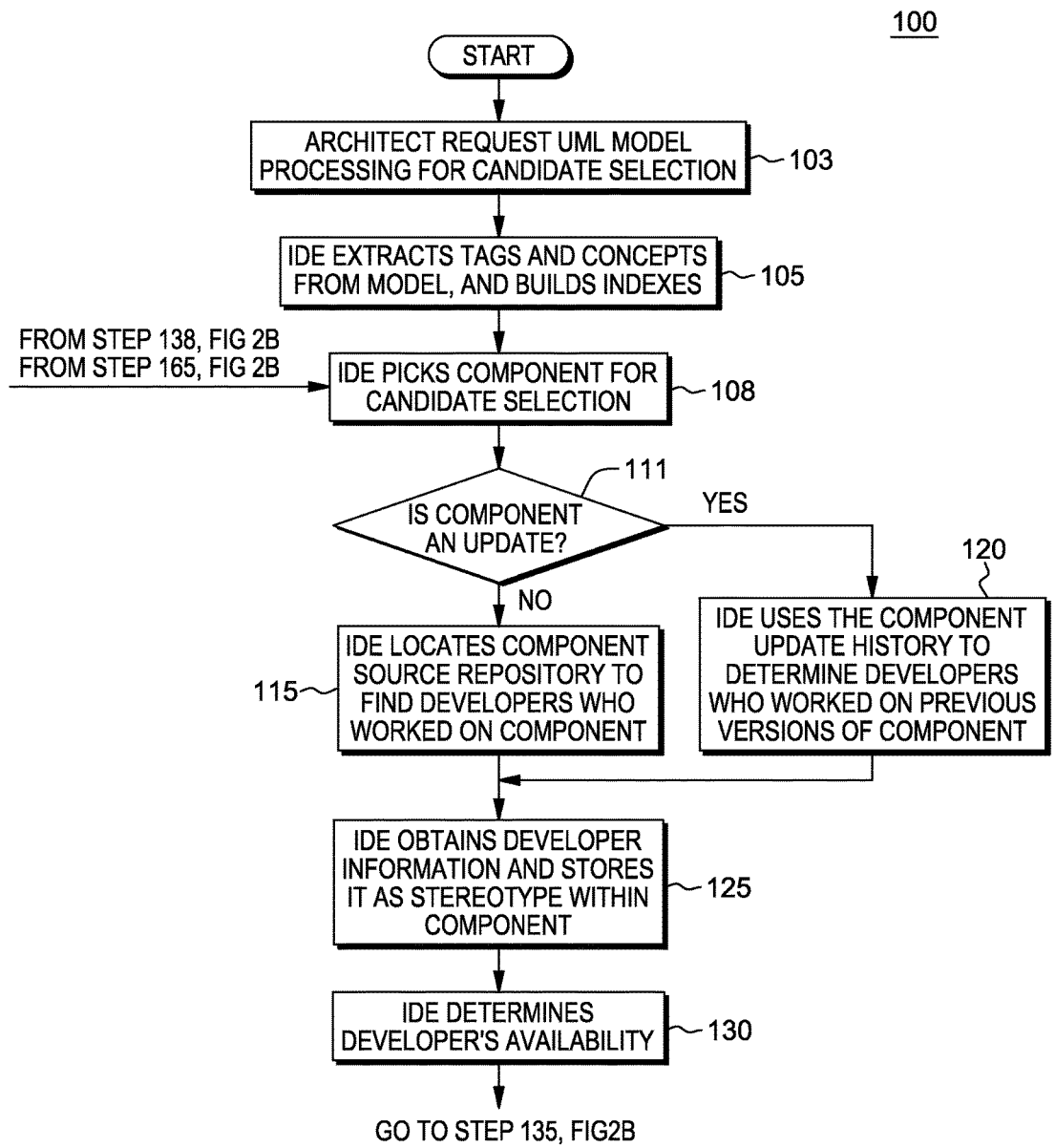
FIGS. 2A and 2B depict using the system 10 of FIG. 1, an overall method 100 of determining in the course of an UML model update, whether an existing developer resource or another developer resource is available for assignment to a component development.
Figure 2B:
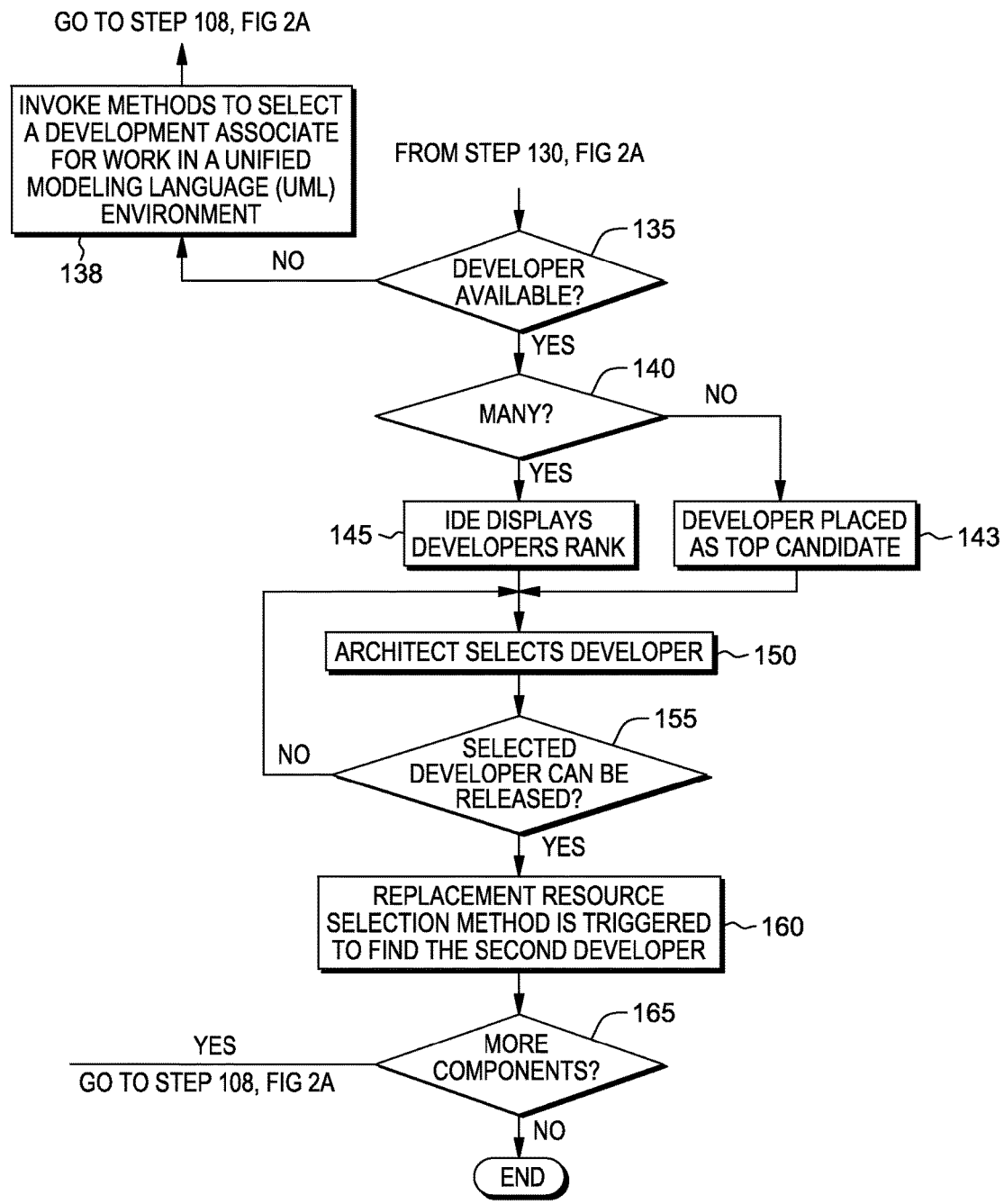

FIGS. 2A and 2B depict using the system 10 of FIG. 1, an overall method 100 of determining in the course of an UML model update, whether the resource who developed the component previously is available for assignment, or whether the component is to be developed by another resource.

As shown at first step 103, FIG. 2A, the architect requests the UML model processing for candidate selection.

Then, at 105, the integrated development environment (IDE) automatically extracts tags and concepts from the model, and builds indexes. That is, the IDE programming environment 11 of FIG. 1, which may typically include a code editor, a compiler, a debugger, and a graphical user interface (GUI), is automatically triggered to extract certain tags and concepts for building an index for storing components in a memory storage repository, e.g., a database. One of these repositories includes a component source repository that includes metadata/information and history/versioning details for components in built UML models. For example, using a Keyword/Requirement Assignment functionality, a special keyword may be implemented to designate a modeling element as an update.

For example, an assignment of the 'update' keyword triggers a search for developers who worked on previous versions of the component. In an integrated design and development environment, RTC may be searched to obtain the developers. Developer information is then stored as part of the component.

Then, at 108, FIG. 2A, the IDE selects a component for candidate selection. That is, in the UML model build, the IDE, responsive to developing or updating a new UML model, will select a component(s) to be a candidate(s) for a resource assignment/re-assignment.

In the method, at the next step 111, the IDE implements an algorithm to determine whether the selected component is identified as an update, i.e., is the selected component an existing older previously developed component being manipulated/modified (as opposed to the selected component being a "new" component or one being merely reused from a component repository).

That is, this step detects if a component is an update versus a new/reused component. Depending upon whether the UML element is an update or merely a reuse of an existing component, the method includes determining the optimal developer resource. A component history detection step may be performed by looking at a component update history or a repository history. That is, a component history detection process is implemented that: 1) is based on a Component's Update History in which a keyword triggers a search of the component history to obtain developers who worked on a previous version of the component (step 120, FIG. 2A); or 2) is based on Repository History (step 115, FIG. 2A) wherein absence of a keyword triggers a search in component repositories for component development history, and associated developers.

Component History Detection

In one embodiment, during the UML model build, an automated process is performed that traverses a component history database store 38 to determine history of the component itself. For example, traversal of the component update history applies, e.g., when software has already been developed for a component in Release 1, and that same component is being updated/enhanced in a later Release 2.

In one embodiment, a keyword search is performed on a component update history database that includes a history of the component versions and the developers (resources) involved. The search keyword may be a component name, a name of a particular developer (i.e., name of resource) or a keyword.

More particularly, a UML allows the architecture model of the system being developed to be specified at various levels of details. The UML further provides the ability to develop architecture models that capture updates to an existing system. For example, an existing model is updated with refinements needed for a future release. Alternately, a new architecture model may be developed that references elements of an existing model.

The UML further enables the assignment of information (e.g., pieces of information) to various elements of the architectural model. The assignment may use stereotypes and stereotype properties via the application of one or more UML profiles. Alternatively, UML keywords or comments may be used. Using either approach, the architect may assign one or more keywords (or tags); and/or assign requirements to the element.

Thus, with respect to keyword assignment, a special stereotype or keyword may be used to designate a modeling element as an update. In one embodiment, the keyword 'update' may be used.

Thus, with respect to the Component History Detection assignment functionality for determining a re-assignment to another resource: When based on the component update History database (or like repository), an assignment of the 'update' keyword triggers a search in the development repository 32 for developers who worked on previous versions of the component. In an integrated design and development environment such as one provided by Rational® (which includes RSA & RTC), RTC tool 30 may be searched to obtain the developers. Developer information is then stored as part of the component. This is depicted at steps 120, 125 of FIG. 2A.

Keyword/Requirement Assignment

An example UML element (e.g., component) assignment is now described using an example such as the example 1000 depicted in FIG. 3 depicting a software architect designing updates to an example UML generated authentication module—'User Authentication Module' 1012. In FIG. 3, at 1015, the software architect(s)) assigns a corporate UML profile, and selects a stereotype called 'authentication'. At 1015, the architect assigns values to the selected stereotype's properties, e.g., indicating that the authentication is being called from Java™ using web services over https. They (the software architect(s)) also selects a stereotype called 'proglang' which indicates that the module needs to be developed using Java™ version 1.5. When the software architect(s) assigns the keyword 'update', a search in the Component Update History (e.g., Rational Team Concert tool 30) is triggered, and as indicated at 1018, the developer information is obtained and stored within the stereotype 'developers'. In addition, at 1020, the software architects also assign a set of keywords indicating, in the example depicted, that the module will use the corporate directory for authentication over web services using SSO making use of a service repository. Finally, at 1023, the architect(s) assigns a set of requirements, e.g., REQ01.01 and REQ01.02, that this component is designed to fulfill.

Alternatively, in the absence of a keyword, a search may be triggered in component repositories such as a repository history database to search for a component development history, and associated developers at step 115, FIG. 2A. In this alternate case (e.g., in the absence of an 'update' keyword), the method searches corporate or other component repositories for the matching component. Alternately, the architect may specify the source repository of the component. Once the component is located, the development history of the component is accessed to obtain a list of developers who previously developed the component. The component stereotype 'developers' is then updated with the list of developers as shown at 125, FIG. 2A.

Thus, returning to 111, FIG. 2A, if it is determined that the selected component is existing and not being updated, e.g., a reuse, the process proceeds to step 115, where the IDE locates a component source repository to search through the repository to find a developer(s) who previously worked on that component. For example, this may occur when software for the component has been built on a different project and will be reused in a current project. Otherwise, it is determined at 111 that the selected component is an existing component being updated, at 120 the IDE 11 of FIG. 1 searches the component update history repository 32 to determine the one or more developer(s) who worked on previous versions of the component. In one embodiment, the IBM Rational® tools such as IBM's RTC 30 may be searched to obtain the developers. Developer information is then stored as part of the UML component.

Resource Availability Determination

After a component developer(s) is(are) identified, the system determines their current availability. If all developers are currently assigned, the method determines whether a developer can be released from their current assignment and reassigned to the component development.

To this end, referring back to FIG. 1, system 10 includes a Developer's Availability Processor module 25 configured to access and use development history 32 and defect store 34 and quality metrics (from a Quality Metrics processor module 40) to determine a developer's ranking based on what the developer has been working on (including defects of code sourced by that developer). A developer work assignments module 36 use the candidate selection processor module 15 to determine if a developer can be assigned in which case, a Resource Replacement Processor module 60 is used to determine another developer to replace the component developer. When no developer is available, IDE 11 uses an Automated Skill Test Processor 50, to find potential candidates as will be described in greater detail herein below.

Generally, from steps 130-150, FIG. 2B, functionality of methods run in the IDE determines the top candidate developer(s) and an IDE determination is made as to whether the developer(s) determined in the list is(are) available. For this purpose, a central resource assignment repository 36 of system 10 of FIG. 1 may be used which details current software programmer and their current assigned projects. Alternately, if all the resources are managed across assignments within a tool such as IBM's RTC, then that tool is accessed. The list of project areas and team areas the developer belongs to can be further retrieved in order to determine if they are still in the component/project.

In one embodiment, if determined available, the developer is placed at the top of the candidate selection list.

Alternately, if multiple developers are available, then IDE system processor is programmed to implement methods performing a ranking of the optimal developers at step 145, FIG. 2B. In one embodiment, one or more of the following factors may be used to rank the developer: (1) obtaining and determining quality metrics of the code the developer produced. In one embodiment, this functionality may be performed using the quality metrics processor 40 of IBM's RTC tool (e.g., to generate the list of defects field against this developer in the component); and (2) a component version the developer worked on (e.g., a developer who worked on a more recent version is preferred over someone who worked on an earlier version and may be ranked higher).

Further, if all the developers are assigned to other engagements, the IDE 11 using resource replacement processor 60 implements methods to determine whether a developer can be released from their current assignment and reassigned to the component development. A number of factors may be used to determine if a developer can be released from their current assignment and reassigned to the component development.

Thus, returning to FIG. 2A, at 125, after the IDE obtains the developer information who worked on the component and stores it as a stereotype within the component of the new UML model being developed, at 130, the IDE then determines the developer's availability and the process proceeds to step 135, FIG. 2B.

At 135, FIG. 2B, from the developer information obtained, a determination is made as to whether the developer is currently available. In one embodiment, this may be determined by the IBM Rational Team Concert tool 30 of FIG. 1.

If, at 135, it is determined that the developer is not currently available, the method proceeds to 138 to invoke a process for selecting a development associate for work in a unified modeling language (UML) environment. One method for selecting a development associate is described in herein incorporated commonly-owned, co-pending U.S. patent application Ser. No. 13/546,301 (e.g., by looking at attributes of components and/or skills needed to look for a new developer). After selecting a development associate for work in a UML environment, the process returns to step 108, FIG. 2A.

Otherwise, if at 135, it is determined that the developer is currently available, the method proceeds to 140 to determine whether multiple developers are indicated as available. For example, if only one (1) developer is available, that developer is assigned the top candidate at 143. Otherwise, the method proceeds to 145 where, if plural developers are available, a method for ranking the developers is invoked. Ranking may include looking at quality metrics of the code that was worked on by the developer and/or, the version history, e.g., a recency of the code developed by that developer (e.g., the developer who coded a more recent version of the code may be ranked higher). The IDE is configured to display the developer's rank. Whether a developer is indicated as a top candidate at 143, or given the list of plural developer's and their ranking at 145, the method proceeds to 150 where the software architect selects a developer.

Then, at 155, FIG. 2B, a determination is made as to whether the developer selected at 150, is available and can be released from his/her current work assignment. The determination may be made by the IDE's Developer's Availability Processor module 25 of using information in the RTC tool 30. In one embodiment, FIG. 4 describes a method implemented by the Developer's Availability Processor module 25 for ranking a developer to automatically determine if a developer can be released from their current assignment and reassigned to the component development.

Figure 4:
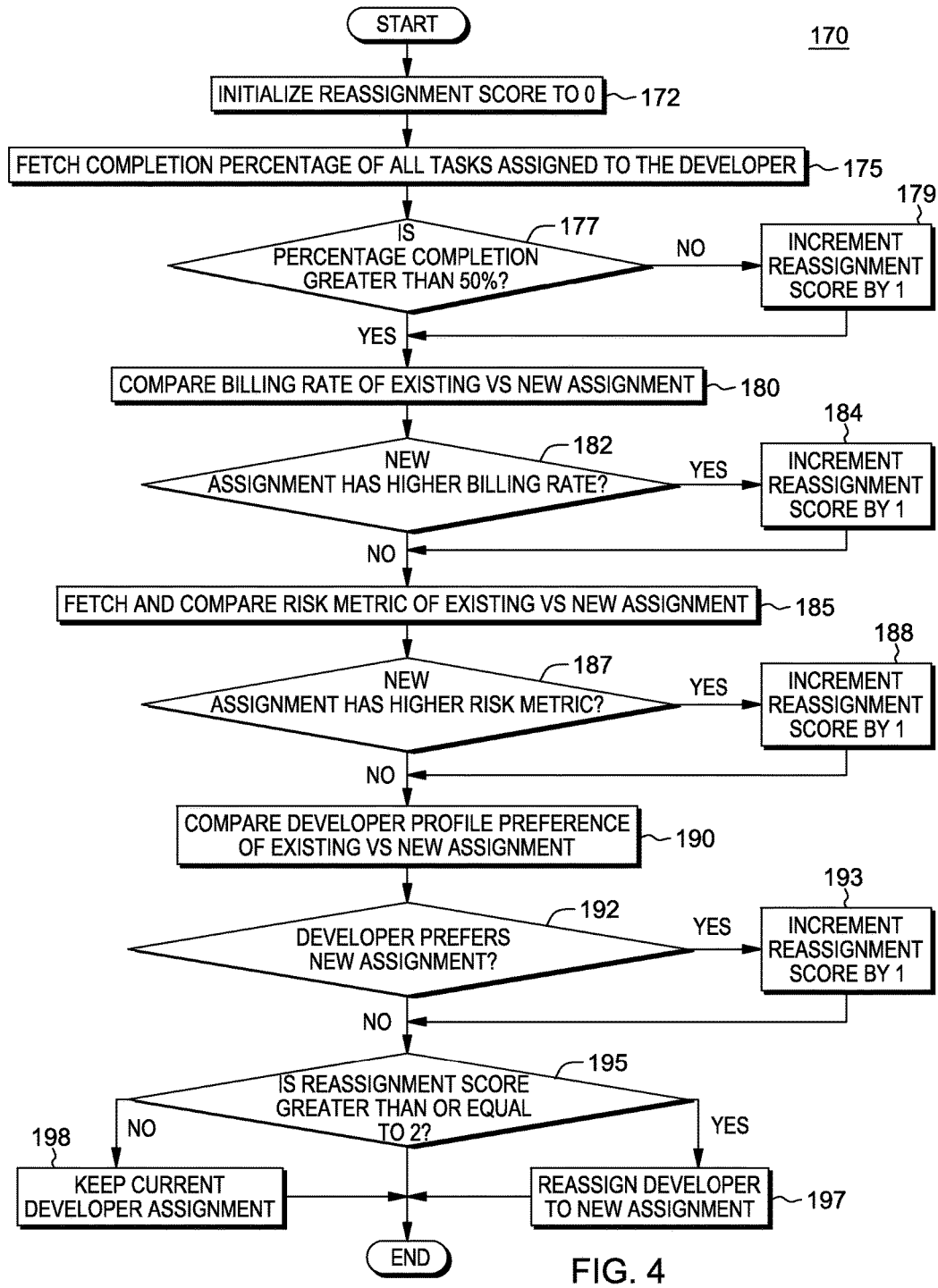
FIG. 4 shows one embodiment of a scoring method 170 to automatically determine if a developer can be released from their current assignment and reassigned to the component development.

FIG. 4 shows one embodiment of an example scoring method 170 implemented in the IDE development environment to automatically determine if a developer can be released from their current assignment and reassigned to the component development. At a first step 172, the developer's reassignment "score" is initialized, for example, to a value of zero (0). Then, at 175, the method performs automatically determining how far into development is the assignment, which can be determined by retrieving the list of assigned work items and the status of them. Then, at 177 a determination is made as to whether the percentage completed on that project for that developer is greater than 50%. If it is not greater than 50%, then the process proceeds to step 179 where the reassignment score is incremented, for example, by a value of one (1), and the process proceeds to step 180. Otherwise, at 177, if the percentage completed on that project for that developer is greater than 50% the process continues directly to step 180. At step 180, there is compared the potential revenue change by comparing the billing rate of the present project versus the billing rate of the reassigned project. Thus, at 182 a determination is made as to whether the new assignment would result in the developer being billed at a higher billing rate. If the new billing rate is greater than the developers current assigned billing, then the process proceeds to step 184 where the reassignment score is incremented, for example, by a value of one (1), and the process proceeds to step 185. Otherwise, at 182, if the billing rate for that developer to be reassigned is less than that developer's current billing rate, the process continues directly to step 185. At step 185, FIG. 4 there is performed a comparative assignment of risk and impact rating. That is, there is first obtained a value for the risk metric associated with the existing assignment (for that developer) and that value is compared against the risk metric associated with the new reassigned project. Thus, at 187 a determination is made as to whether the new assignment has a higher risk metric as compared to the current risk metric associated with the existing assignment. If the risk metric associated with the new reassigned project is greater than the current risk metric associated with the existing assignment, then the process proceeds to step 188 where the reassignment score is incremented, for example, by a value of one (1), and the process proceeds to step 190 where a developer profile preference is evaluated. That is, at 190, a comparison is made as to whether the developer profile indicates preference for the new reassigned project, as compared to a preference for the existing assignment. For example, one assignment may require on-site vs. other assignment is remote/local and the developer may have indicated an interest in a developer profile. Proceeding to 192, a determination is made as to whether the developer prefers the new assignment. If the developer prefers the new assignment, then the process proceeds to step 193 where the reassignment score for that developer is incremented, for example, by a value of one (1), and the process proceeds to step 195. Otherwise, at 192, if the developer does not prefer the new assignment, the process proceeds directly to step 195 where that developer's current score is determined. At 195, it is determined whether that candidate developer's score is greater than a pre-determined value, e.g., a value of 2. If that candidate developer's score is greater than a pre-determined value, then the process proceeds to step 197 where that developer becomes re-assigned to the new project and the process terminates. Otherwise, at 195, if that candidate developer's score is not greater than a pre-determined value, then the process proceeds to step 198 where it is determined that this developer can not be released and is to remain at his/her current assigned project and the process terminates.

Returning back to FIG. 2B, if, at 155, the developer is determined not available and can not be released from a current work assignment, then the process proceeds back to 150 where the architect may select a next top candidate developer. Otherwise, the process proceeds to step 160 in which case, a Replacement Resource Selection method is triggered to find a second developer to replace the selected candidate.

Replacement Resource Selection

With respect to the Replacement Resource Selecting, if the method determines that a developer can be reassigned, e.g., from another UML model design project, and is available, then a suitable replacement resource (e.g., a second developer) is needed to replace the component developer in their current assignment. The methods implemented in the IDE enable determining a re-assignment of a developer to another resource. In one embodiment, methods described in commonly-owned, co-pending U.S. patent application Ser. No. 13/546,301 may be used to locate the replacement.

Continuing to 165, FIG. 2B, the system determines whether there are any more components to process. If determined that there are more components, then the process returns to step 108, FIG. 2A and the steps are repeated. Otherwise, at 165, if the system determines that there are no more components of the UML model being built to process, the method ends.

Automated Skill Testing

In one embodiment, if no good matches to locate candidates are found using the methods described above, the system 10 may attempt to find potential candidates by sending web based test requests to software engineers who are not currently engaged, or have a limited assigned backlog. The subject matter for the test may be inferred by the component UML design, or the architect may choose from a predefined list. For example, if the component is related to J2EE Database service, the system 10 may send an email to a number of the developers with the smallest backlog, requesting they take an online certification test in J2EE Database access. The scores are then sent to the software architect who can select whom to assign the task.

Expertise Reassignment on Design Changes During Development

Besides looking at the components, and testing the history of the component and (if a history found) looked at the developers who past worked on them to try to bring them in the current model project. In further embodiments, the system and methods herein further methods enable reassignment of development resources when a previously established architecture model (already designed) undergoes a change. The system and method monitors the architecture for such changes. For example, if the architecture had a component that required developers of a specific skill (e.g., database skill), and that architecture undergoes a change such that that component is removed (architecture is changed), then the method would look at the change and re-evaluate the staffing model and determine if any staff (e.g., developer resource) reassignment is required due to the architecture change. There is no look-up of the component history. Rather, a method continuously monitors the architecture (once a program is staffed), and when a change to the model is detected, a number of conditions are used to determine if a resource reassignment is required, e.g., by version control. For example, when a change is checked-in to the version control system, the resource reassignment method is triggered.

Figure 5:
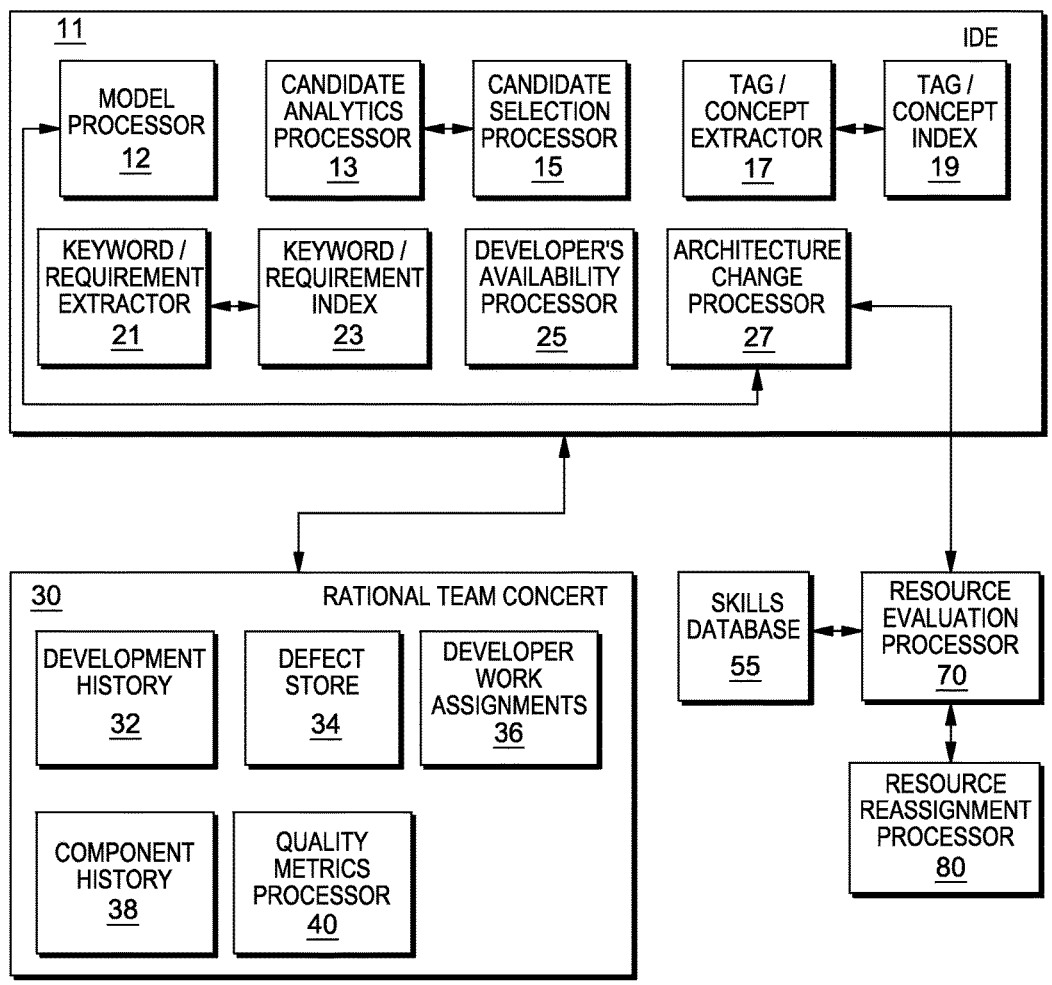
FIG. 5 shows a further computer system 10' implementing methods for performing expertise reassignment on design changes during UML model development.

In one embodiment, an Architecture Change Detection and Processing process implemented in the system 10' of FIG. 5 enables continuous monitoring of the UML and continuous monitoring for changes to UML architecture (e.g., adds, removes, updates are continuously monitored), and triggers a change detection process each time the model is checked in.

In a further embodiment, a Resource Evaluation process enables automated evaluating each change against the skill-set currently available within the development team. Changes that are removals are processed first to determine the development resources that would get freed up.

In a further embodiment, architecture changes are automatically evaluated against existing developer (i.e., staffing) resources with three outcomes: 1) An exact match in skills to accommodate change—needed skills to handle change available in the team; 2) A Partial skills match—proposes change in architecture or run methods in commonly-owned, co-pending U.S. patent application Ser. No. 13/546,301 to find new resources; and 3) A No skills match—run methods in commonly-owned, co-pending U.S. patent application Ser. No. 13/546,301 to find new resources.

In a further embodiment, a cost impact of an architecture change resource is determined where the impact on the project resources due to the change is presented to the architect for a go/no-go decision.

FIG. 5 shows a computer system 10' implementing methods for performing expertise reassignment on design changes during UML model development. As depicted, implementation system 10' implements the same or similar components as system 10 such as described herein with respect to FIG. 1. As part of computer system 10' is the Integrated Development Environment 11, and a UML Modeling version control system 30, e.g., that may include IBM's Rational® Team Concert product or like equivalent version control unit, a Skills Database 55, a Resource Evaluation Processor 70 to look at changes and current skill sets, and a Resource Reassignment 80 within IDE 11, Model Processor 12 uses a Keyword/Requirement Extractor 21 and an Architecture Change Processor 27, to perform both change detection and processing the changes in a UML model and responsively triggering a call to the Resource Evaluation Processor 70 which uses the Skills Database 55 to evaluate changes against skill-sets within the development team which triggers the call to the Resource Reassignment Processor 800 to proceed with development reassignment as needed. Other IDE components are as provided in the system 10 of FIG. 1 including, but not limited to: Candidate Analytics Processor 13 that analyzes information from the Candidate Selection Processor 15. Further elements include the Tag/Concept Extractor 17 that uses the Tag/Concept Index 19 component from the IDE to assign tags. The Keyword/Requirement Extractor component 21 for processing changes in a UML model uses the Keyword/Requirement Index 170 to gather the proper keyword ids. Developers Availability Processor 25 determines when a developer is available for an assignment.

Components of the Source (version) control system 30 (e.g., RTC) as in system 10 of FIG. 1 include: the Development History 32, which contains history of what has been developed; the Defect Store 34 that contains information about defects where developers have worked on; Developer Work Assignments 36 that includes the history of work developers that have been worked in; a Component History 38 contains the list of components developers have worked on; and a Quality Metrics Processor 40 analyzes information about past developers assignments to determine their quality level.

Architecture Model Specification

The UML allows the architecture model of a system being developed to be specified at various levels of details. Commonly developed models include, but are not limited to: system context, architecture overview, analysis (or platform independent) and enterprise design (platform specific). In an embodiment, the architect develops a UML model consisting of but not limited to components, component associations (structural view), component interactions (behavioral view) and component deployment (operational view).

The UML further enables the assignment of portions of information to various elements of the architectural model. The assignment may use stereotypes and stereotype properties via the application of one or more UML profiles.

Alternatively, UML keywords or comments may be used. Using either approach, a software architect may assign one or more keywords (or tags); and/or assign requirements to the UML element.

As example assignment to a UML element is as described herein above in the example shown in connection with FIG. 3. The example of FIG. 3 may be part of an original architecture used to originally staff developers for this project component 1000. As shown in the second example of FIG. 6, an architecture change has occurred, particularly, an enhancement 1100 to the component 1000. Particularly, the architect is designing an authentication module entitled 'User Authentication Module' 1100 which includes newly added entities. They assign a corporate UML profile and select a stereotype 1112 called 'authentication' 1115, for example. Then values 1120 are assigned by the architect to the selected stereotype's properties indicating that the authentication is being called from java using web services over https. They also select a stereotype called 'prog-lang' 1125 which indicates that the module needs to be developed using java version 1.5 supporting Java script. In addition, they also assign a additional set of keywords 1130 indicating that the module will use the corporate directory for authentication over web services using SSO (single sign on) making use of a service repository, for example. Finally, the architect has changed an assigned set of requirements 1150 that this component will fulfill. The information in this example 2 of FIG. 6 is processed and the systems generates a list of developers who can perform the changes.

Architecture Change Detection

A previously established architecture model undergoes changes through the lifecycle of project delivery. Changes could occur in any part of the model including, but not limited to: UML elements such as components, component associations, component interactions and component deployment. A change may be to add or remove or to update elements in the model.

For example, an "add" is a system functionality for introducing one or more new elements (e.g., components) into the model. As part of the addition, the architect assigns keywords/requirements to the elements as described above. It should be noted that an "add" may change several parts of the model. For example, the addition of a new component may result in updates not only to components but also to component associations and interactions. An add may require new development resources to deliver the elements.

A "Remove" system function deletes one or more elements from the model. The deletion may require reassignment or release of a development resource to maintain an optimal staffing model.

An "Update" changes the specification of one or more elements in the model. For example, taking the example described with respect to FIG. 3, it may be assumed that the requirements have been enhanced via a change request to support authentication using a social network such as facebook, in addition to corporate directory based authentication. This change adds several enhancements to the User Authentication Module 1000 (of FIG. 3). The updated component definition 1100 is specified in view of the further example described in view of FIG. 6 showing additional keywords 1135 being added (facebook, oauth).

In one embodiment, the system employs sensors, e.g., using Architecture Change Processor 27, for continuously monitoring the architecture model for such changes. In one embodiment when the model is version controlled using a system such as Rational's RTC, the change detection process may be triggered each time the model is checked in.

Figure 7A:
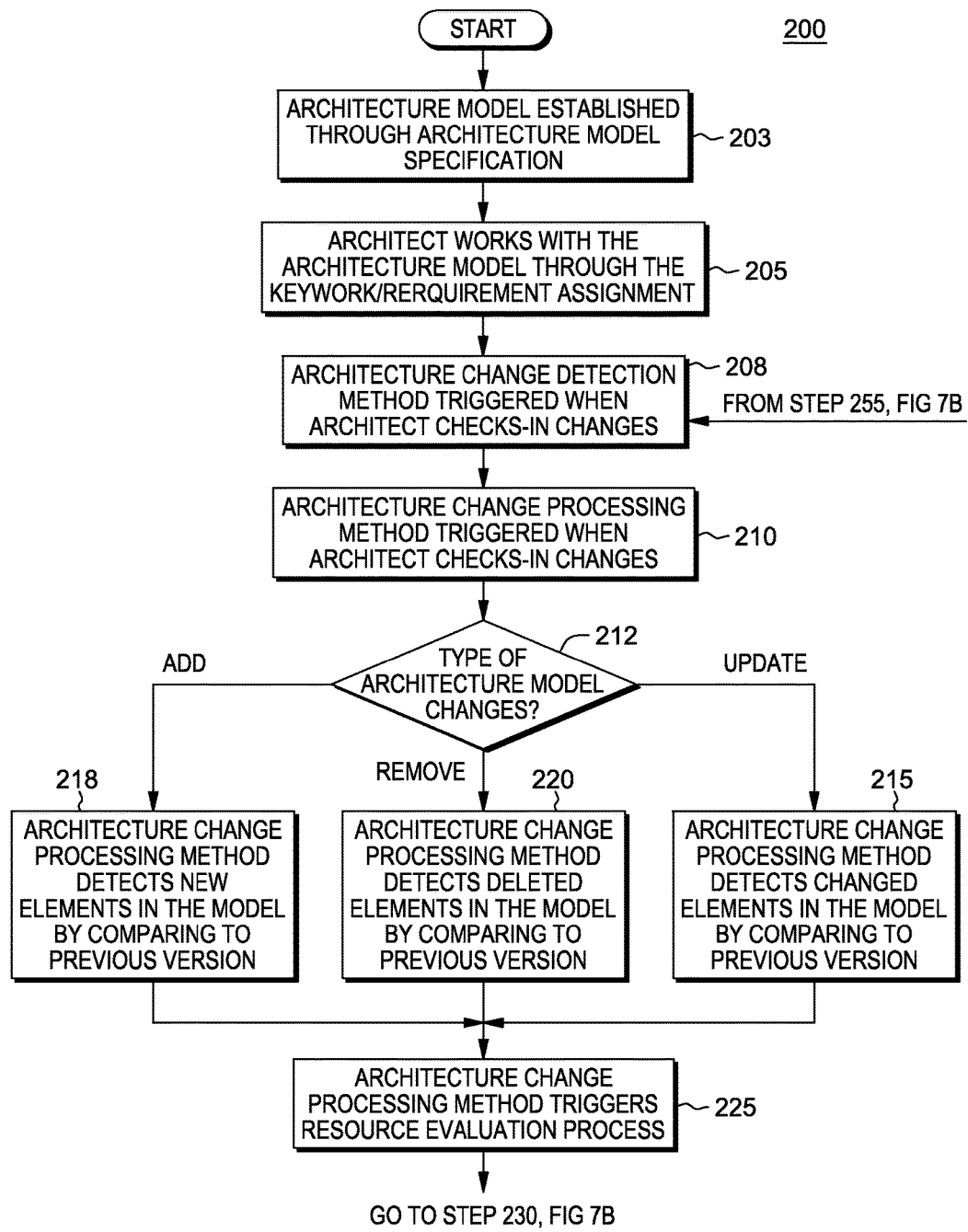
FIGS. 7A and 7B depict using the system 10' of FIG. 5, an overall method 200 of determining a change in developers in the course of detecting UML design updates.
Figure 7B:
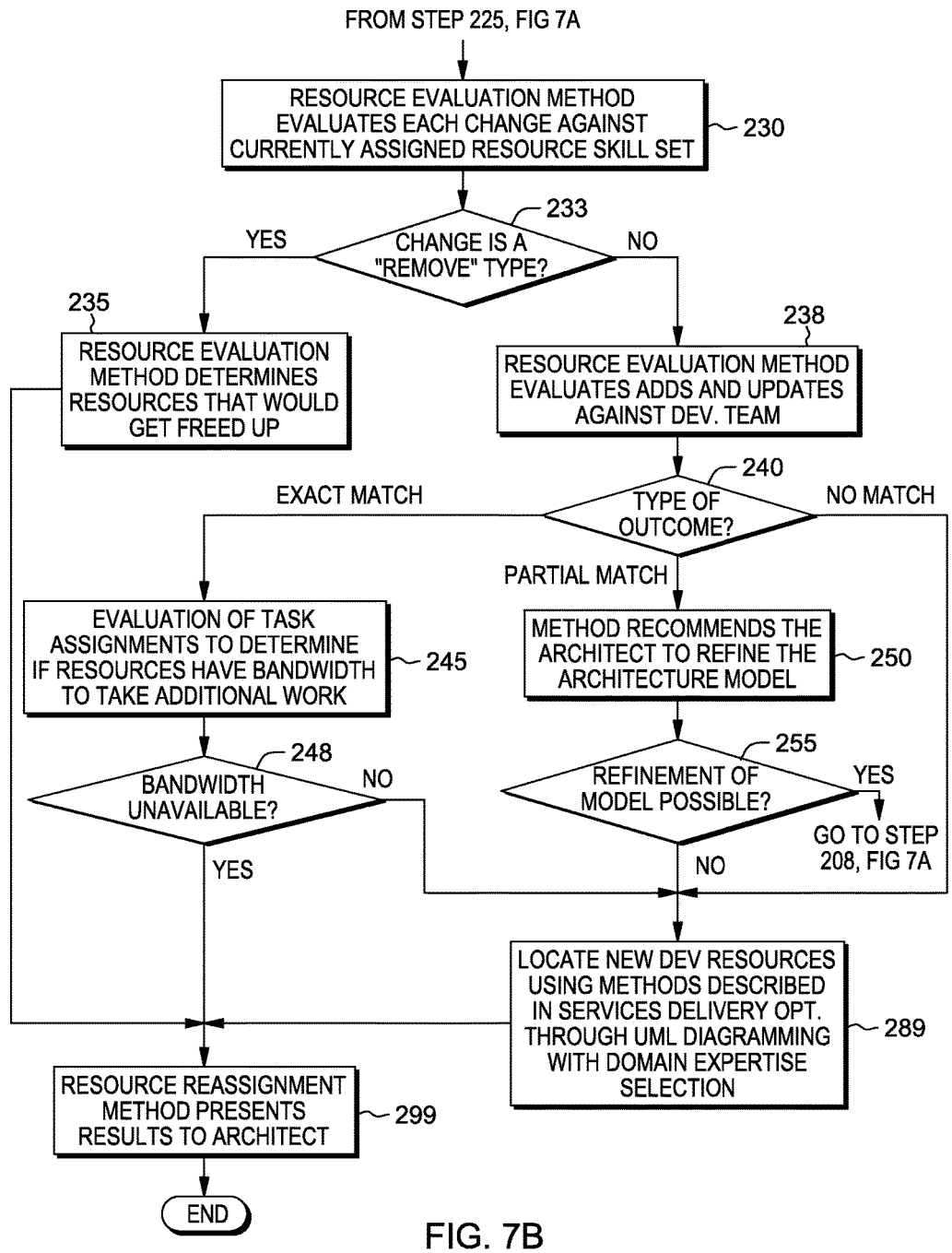

FIGS. 7A and 7B depict using the system 10' of FIG. 5, an overall method 200 of determining a change in developers in the course of detecting UML design updates.

As shown at first step 203, FIG. 7A, the architect requests an architectural model established through Architecture Model Specification. Then, at 205, an architect works with the architectural model, e.g., through the keyword/requirement assignment (the architect would assign information to the various elements of the UML, for example, development team requirements for developing the component, e.g., a database programmer, and keywords would be assigned). Then, at 208, a known architecture change detection method is triggered when the software architect "checks-in" changes.

Architecture Change Processing

When a change to the architecture model is detected, it is processed by comparing the latest revision to the earlier version of the model. Changes to the model itself are collected, along with changes to keywords, stereotypes and comments associated with elements of the model. Once this processing is complete, a classification of the change is made and the impact to the staffing for the model is triggered.

Thus, at 210, the method includes triggering an architecture change processing method responsive to the architect checking in these changes and outputs one of Add/Update/Remove which is then processed by the decision block 212. Then at 212, a determination is made as to the type of Architecture modal change, i.e., update, add, or remove, and then the skill set of resources are evaluated based on the changes.

If the UML model element change detected is an "Update" change, the process proceeds to step 215, FIG. 7A, where the architect change processing method detects changed elements in the model as compared to the previous version of the model. Similarly, if the UML model element change detected is a "Remove" change, the process proceeds to step 220 where the architect change processing method detects deleted elements in the model by comparison to the previous version of the model. Likewise, if the UML model element change detected is an "Add" change, the process proceeds to step 218 where the architect change processing method detects new elements in the model by comparing the changed model to the previous version of the model. Finally, at 225, the Architecture change processing method triggers the resource evaluation process.

Resource Evaluation

Proceeding to step 230, FIG. 7B, resource evaluation includes evaluating each change against the skill-set currently available within the development team. If the changes detected are removals as determined at step 233, then the process proceeds to 235 to first determine any development resources that would get freed up since the tasks associated with the removed elements are no longer required. After determining those development resources that are to be freed up, the process proceeds to step 299 where the resource reassignment method presents the results to the software architect. If, at 233, it is determined that the changes detected are not removals but either an "add" or an "update" change, these changes related to "adds" and "updates" are evaluated against the skills set of the development team at 238. This evaluation is performed at 240 and has three possible outcomes—an exact match, a partial match or no match.

An exact match indicates that the skills required are already available within the team. Task assignments of the matching resources will then be evaluated to determine if the resources is available (i.e., has time bandwidth) to take on the additional work. For example, any resource freed up due to removals may be assigned 100% bandwidth. If bandwidth is unavailable, the methods described herein may be used to locate new development resources.

In the case of a partial match, the system recommends the architect to refine the architecture model, e.g., the original architected model requires a developer with Java programming skills however, the change requires a developer with a specific programming skill within Java. If refinement is possible, change detecting/processing is rerun after the refinement is made. Otherwise, the methods described hereinabove may be used to locate new development resources. Finally, if no matching resource is found within the team, then the above-described methods described in connection with FIGS. 2A-2B may be used to locate new development resources.

Thus, returning to step 240, FIG. 7B if it is determined that the outcome results in an exact match, the process proceeds to step 245 where there is performed evaluating the current task assignments and determining at whether the current resources have additional availability or "bandwidth" to take on additional work. A determination is made at 248 as to whether bandwidth of the resource(s) is available. If bandwidth of the matching resources is available, then this result is communicated to the software architect at 299, FIG. 7B. Otherwise, if a determination is made at 248 that the resource(s) are not available, then the process proceeds to 289 where methods such as described herein with respect to FIGS. 2A, 2B are implemented to detect new resources. After such detection, the results are reported to the architect at 299 and the process terminates.

Referring back to step 240, if it is determined that the outcome results in a partial match, the process proceeds to step 250 where a recommendation is made to the software architect to refine the UML Model. At 255, a determination is made, e.g. by the software architect, whether the UML model can be further refined. If the model can be further refined, then the process returns to step 208, FIG. 7A to trigger the architecture change detection method when the software architect checks-in further model refinements. Otherwise, at step 255, if it is determined that the UML model can not be further refined, the process proceeds to step 289 to perform the methods herein for automatically detecting new resources after which the results are reported to the architect at 299 and the process terminates.

Referring back to step 240, if it is determined that the outcome results in no match, the method proceeds to step 289 to perform the methods described herein to automatically detect new resources and reporting those results to the architect at 299.

Architecture Change Resource Cost

While making a change, the architect may not readily determine the impact on the project resources. Thus, after the resource evaluation is complete the system may summarize the resource impacts of the change to the architect. The cost impact may take into account the need to bring on additional resources, impact to delivery time frame, and impact to other modules within the project due to adding to current resource assignment backlogs. This may be visually represented to the software architect who may wish to roll-back the proposed change, or postpone for another development sprint.

Resource Reassignment

In one embodiment, with respect to resource reassignment, in one embodiment, the results of the resource evaluation at step 299 may be presented to the architect as two candidate lists—(1) candidates that can be brought in to support the changes, and (2) resources that can be released from the project.

Automated Skills Gap Analysis and Lesson Plan Development on Partial Expertise Match The disclosure of herein incorporated co-pending U.S. patent application Ser. No. 13/546,301 describes methods to optimize development resource selection based on architecture models. When development resource skills do not exactly match the needs specified by the architecture model, further methods are automatically implemented to generate a lesson plan for the resources.

Figure 8:
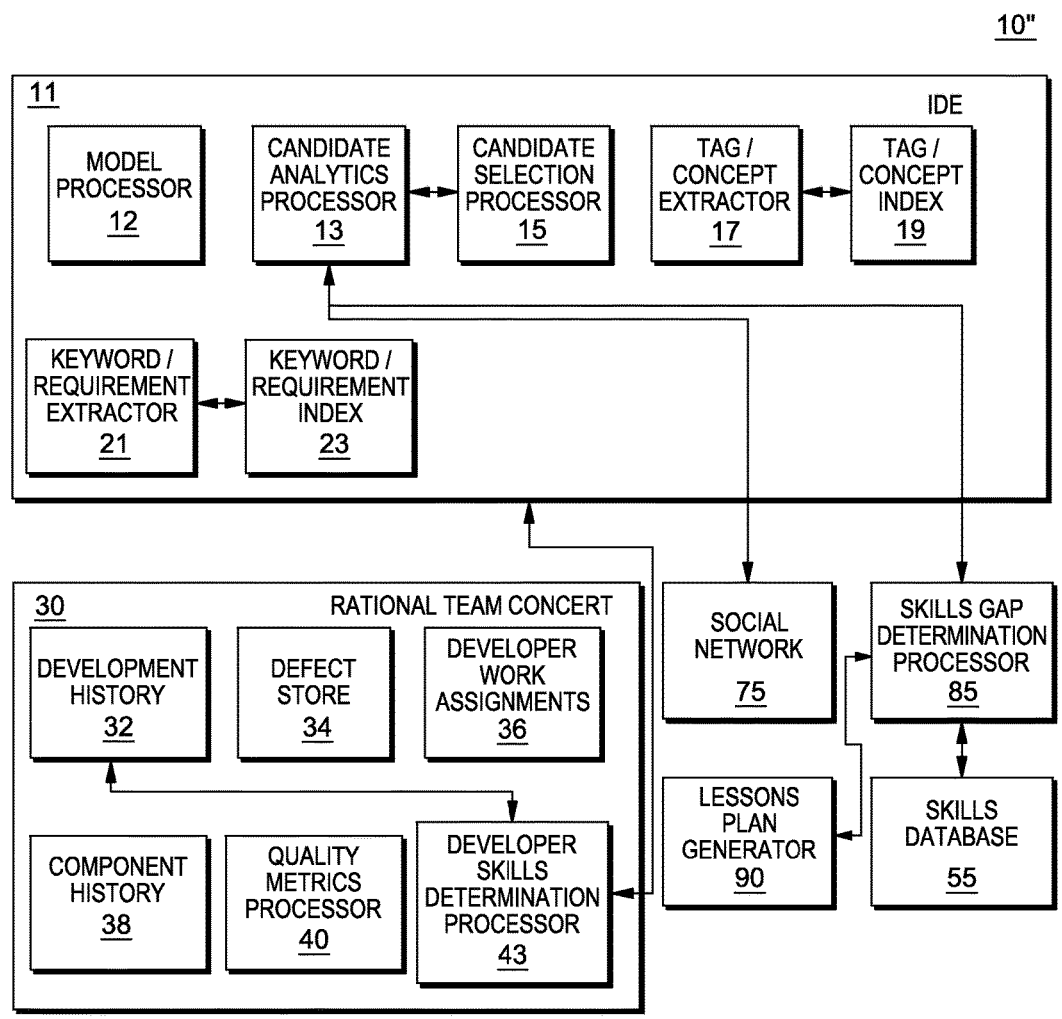
FIG. 8 shows a computer system 10" implementing methods for automatically developing a lesson plan when there is a gap between needed and available skills within the developer resources.

FIG. 8 shows a computer system 10" implementing methods for automatically developing a lesson plan when there is a gap between needed and available skills within the developer resources.

As depicted in FIG. 8, system 10" implements the same or similar components as system 10 such as described herein with respect to FIG. 1. As part of computer system 10" is the Integrated Development Environment 11, and a UML Modeling version control system 30, e.g., that may include IBM's Rational® Team Concert product or like equivalent version control unit, the Skills Database 55, and further elements including an interface to a social network 75 (e.g., MySpace, Facebook, LinkedIn, etc.), a skills gap determination hardware processor 85 used by the IDE 11 to determine in the gap in skills, aided by Skills Database 55, and a Lesson Plan generator module 90.

Within IDE 11, the Model Processor 12 uses a Keyword/Requirement Extractor 21 and the Keyword/Requirement Extractor component 21 for processing changes in a UML model uses the Keyword/Requirement Index 170 to gather the proper keyword ids. In the IDE, the Candidate Analytics hardware Processor 13 uses the Social Network 75 to rank candidates and analyzes information from the Candidate Selection Processor 15. The IDE 100 uses the Skills Gap determination processor 85 to identify the current needs, using the Skills Database 55 and call the Lessons Plan Generator 90 to generate the lessons plan for each candidate. Other IDE components are as provided in the system 10 of FIG. 1 including, but not limited to: the Tag/Concept Extractor 17 that uses the Tag/Concept Index 19 component from the IDE to assign tags.

Components of the Source (version) control system 30 (e.g., RTC) as in system 10 of FIG. 1 include: the Development History 32, which contains history of what has been developed; the Defect Store 34 that contains information about defects where developers have worked on; Developer Work Assignments 36 that includes the history of work developers that have been worked in; a Component History 38 including the list of components developers have worked on; and a Quality Metrics Processor 40 analyzes information about past developers assignments to determine their quality level.

The IDE 11 uses the Source Control System 30 (RTC), specifically the Developer Skills Determination hardware processor 43 to implement methods to gather skill needs based on Development History 32.

In one embodiment, the system 10" uses a centrally maintained and collaboratively built skills map to determine the path to target (needed) skills. The system 10" uses multiple evaluation methods described in detail herein below to determine from the skills map how paths can be charted from the development resource's current skill nodes to the target nodes required by the architecture model.

Figure 9A:
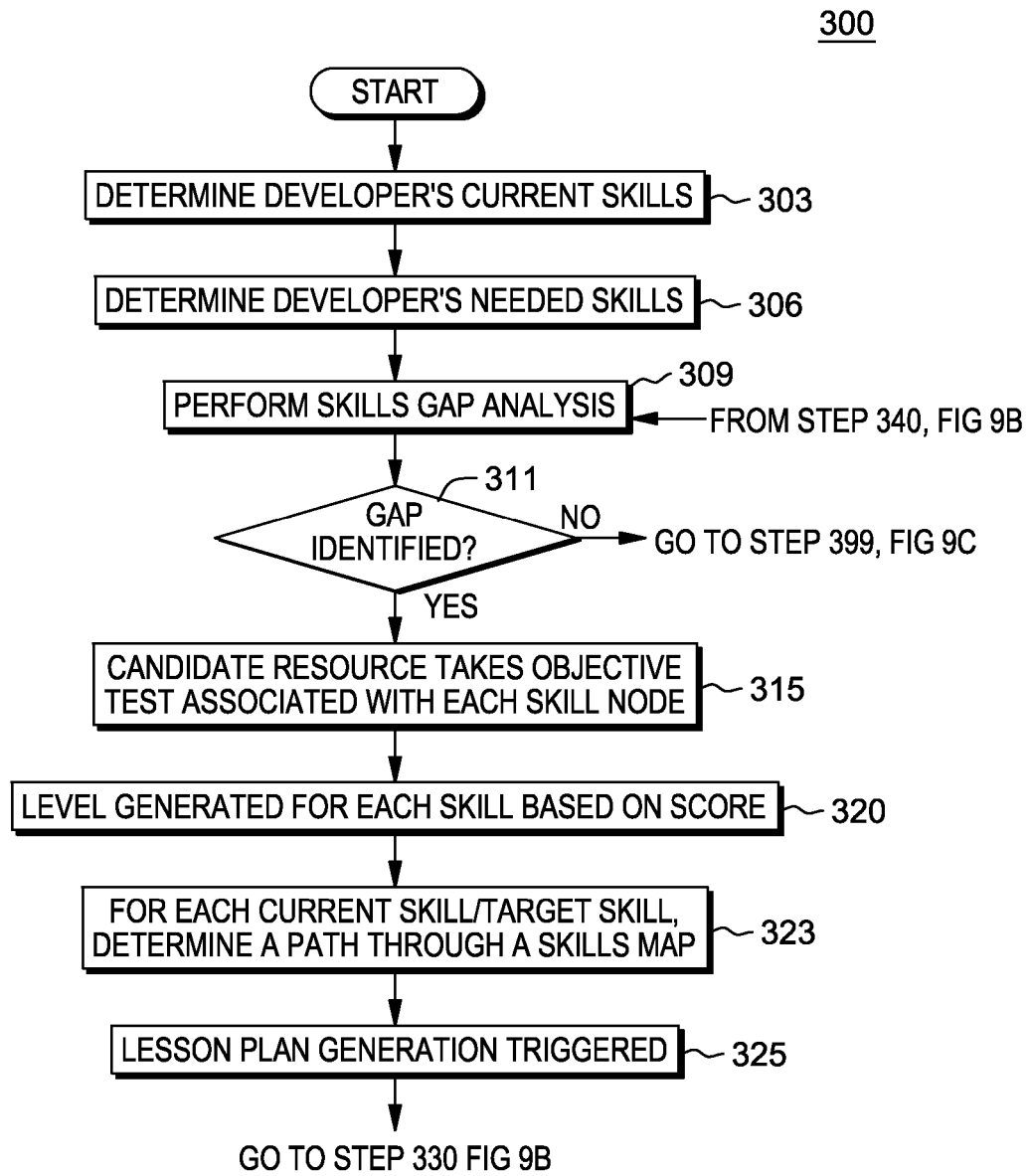
FIGS. 9A through 9C depict using the system 10" of FIG. 8, an overall method 400 of automatically generating a lesson plan.
Figure 9B:
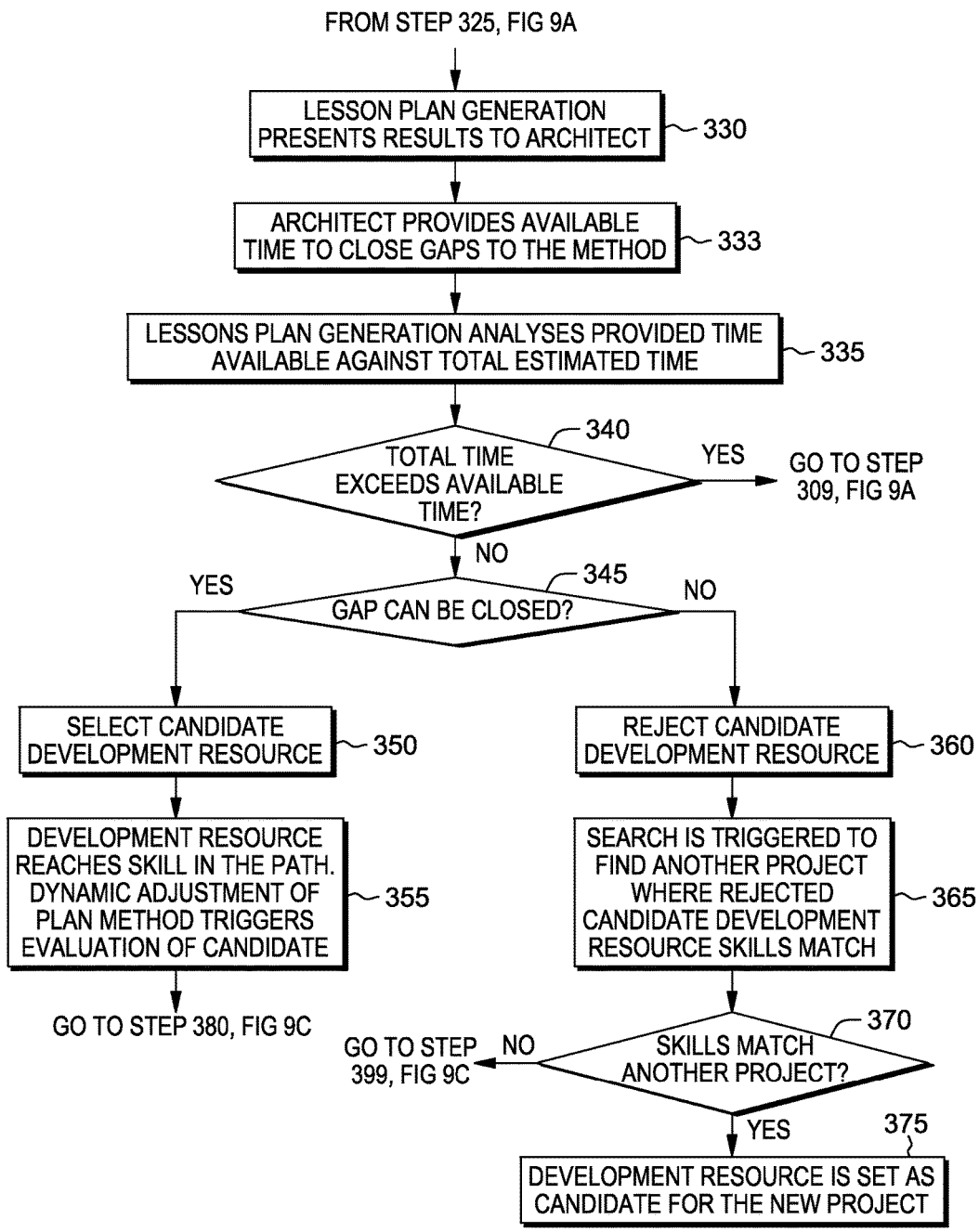
Figure 9C:
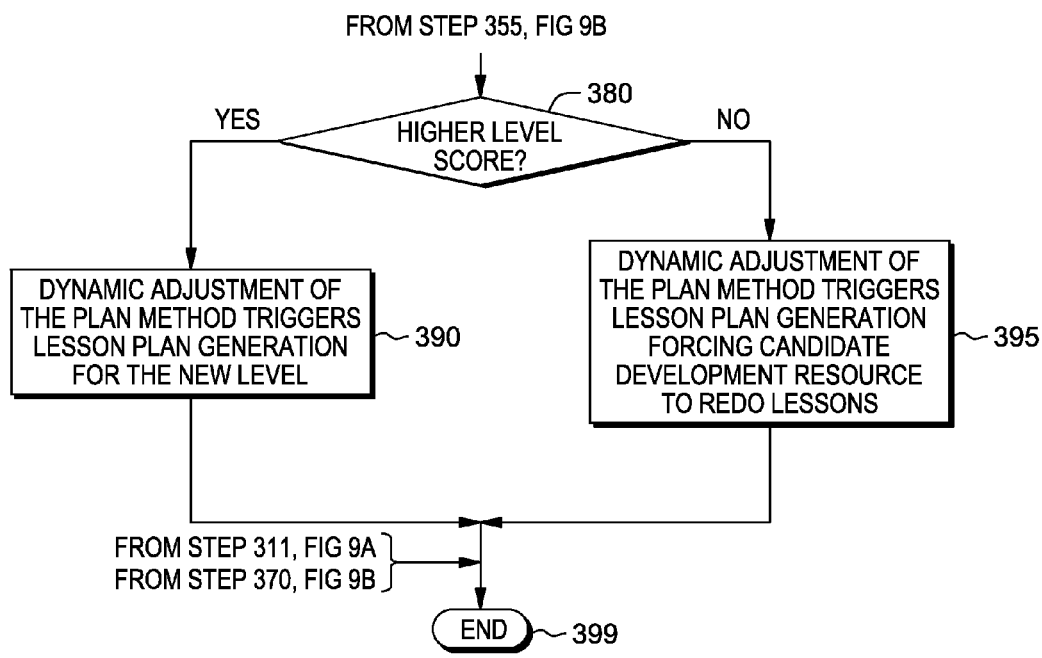

FIGS. 9A-9C depict an overall method 300 of automatically generating a lesson plan for obtaining candidates when for current or existing developer resources skills do not exactly match the needs specified by the architecture model.

As shown at first step 303, the developer Skills Determination Processor 43 receives data comprising the current developer skills, and at 306, receives data representing the needed skills for the architecture model, or determines the needed skills. The systems and methods described in co-pending U.S. patent application Ser. No. 13/546,301 may be implemented to obtain both current skills of a candidate development resource and the needed skills. Then, at 309, the system performs a skills gap analysis by invoking a process to automatically ascertain whether a gap in the skills of the particular resource is performed. This process determines the delta between the skills set of the current developer and the needed skill set for enhancing an old UML element, e.g., a component, or generating a new component. In one embodiment, all paths from current to target (needed) skills are determined via the established skills map.

Figure 10:
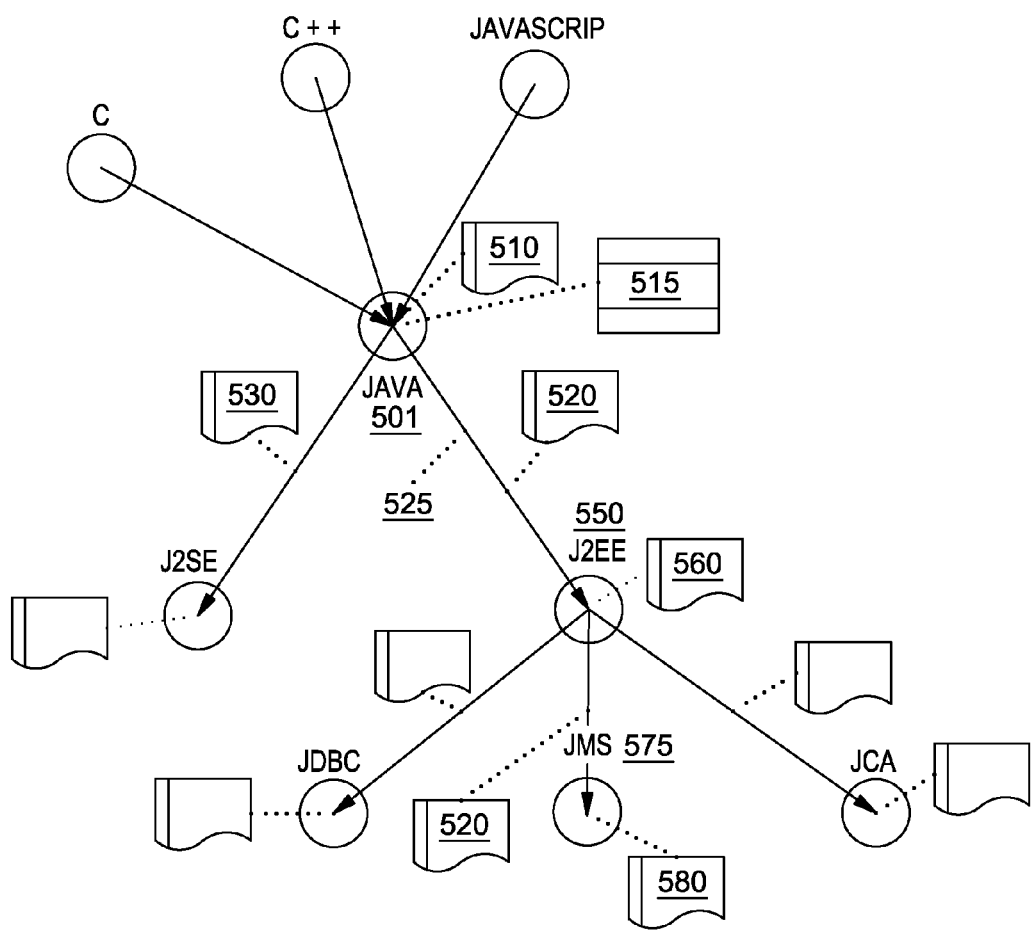
FIG. 10 is a schematic depicting an example skills map used for automatic lesson plan generation in one embodiment.

FIG. 10 is a schematic depicting an example skills map 500 used for automatic lesson plan generation in one embodiment. A skills map 500 may include a non-cyclic fully connected directed graph with each node in the graph, e.g., nodes 501, 550, etc., represents a technical skill. Each edge between nodes represents a skills transition from a source to the target node. In one embodiment, a target node has one or more source nodes wherein each source node may represent a prerequisite skill. Each node has an associated Node Property that represents a specific skill, and methods are provided that function to evaluate a candidate's skill at that node. Skills map further includes an associated node transition property having one or more lessons associated with it. Objective tests can be associated with a specific skill. An association of "tests" to a node may be done in one of two ways: 1) By using tags or keywords related to the technical skill, and using a central repository to select a test based on the tags; or 2) by pre-configuring each node and associating tests with that node.

Skills map node properties include: a specific skill and the ability to evaluate a candidate development resource whose skill matches the node's skill. Evaluation may be via an objective test associated with the node and administered automatically. In one embodiment, scoring may generate a skill level for the resource, e.g., scaled of 1 to 5 with 1 representing expert and 5 representing no skill. The skill level of the resource determines lesson plan.

Skills map transition properties include: one or more associated lessons. A lesson may be electronic material associated with the node, links to on-line resources, a self-paced course, etc. Each lesson has a time estimate associated with it that specifies how long it would take someone to complete the lesson. For each source node skill level, a different lesson(s) may be associated. Further, associated node lessons may be sequenced.

The skills map 500 may be used for developing a lesson plan when there is a gap between needed and available skills within the development resource. A skill maps may be collaboratively maintained within a corporation or a social community. In one embodiment, the skills map may be maintained as an open editable map.

Thus, with respect to the skills gap analysis, the method includes identifying, in the skills map, skill nodes corresponding to all current skills. Candidate resources take objective tests associated with each skill node. Based on a score, for each skill, a level is generated and assigned to the developer resource. For each current skill/target skill pair, in one embodiment, a shortest path through skill map is determined Alternate methods may be employed such as but not limited to: optimizing on the total time estimate of all needed lessons. Once all the paths have been determined, the method triggers generating a lesson plan.

Thus, once the current and needed skill sets have been analyzed, a determination is made at step 311, FIG. 9A as to whether a gap has been detected. If no gap has been detected, the process ends at step 399, FIG. 9C. Otherwise, if at 311 it is determined that a skills set gap has been detected, the process proceeds to 315 where a candidate resource (e.g., developer) is prompted to take an objective test associated with each skill node for evaluation thereof. The test taken by that developer results in generating a score. Then, for that developer, the method generates a level for each skill based on the score at 320.

For example, within the schematic of skills map 500 of FIG. 10, each node, e.g., nodes 501, 550, 575, etc. represents a particular skill. For example, node 501 represents a skill or an expertise in Java while node 550 represents a skill or expertise in Java Enterprise Edition (J2EE). Associated with each node is an evaluation that determines the skills level of the developer at that node. For instance, evaluation data 510 represents an evaluation associated with skill level 501. In one embodiment, each node such as node 501 has an automated method 515 that—(1) administers the evaluation 510, and (2) generates a score for the developer that represents their proficiency in that skill.

A node transition, such as an edge connecting two nodes, represents a skills transition to a new skill. For instance, a transition 525 represents a skills transition from skill 501 (Java) to skill 550 (J2EE). Associated with a skills transition is a lesson plan, e.g., such as a lesson plan 520. A lesson may be electronic material associated with the node, links to on-line resources, a self-paced course etc. Each lesson has a time estimate associated with it that specifies how long it would take someone to complete the lesson. It should be noted that lesson plan 520 may represent multiple lesson plans, with each lesson plan associated with a specific score automatically generated by method 515.

Taking an example of a skills transition from node 501 to node 575, the method implements the following steps: 1) The developer at skill 501 is evaluated by a method 515 using evaluation 110. The evaluation generates a score; 2) Next a transition 525 is used and the developer follows lesson plan 520; 3) Then, at node 550, the developer is evaluated using the evaluation method to result in evaluation 560; and 4) the developer next follows lesson plan 520 and transitions to the target node 575.

Then, continuing to step 323, for each current skill/target skill, the method further determines the path through the skills map 500. That is, skill nodes corresponding to all current skills are identified in the skills map 500. Candidate (developer) resources take objective tests associated with each skill node. Based on their score, for each skill, a level is generated and assigned to the resource. For each current skill/target skill pair, in one embodiment shortest path through skills map is determined. Alternate methods may be employed such as but not limited to optimizing on the total time estimate of all needed lessons. Once all the paths have been determined, lesson plan generation is triggered.

Then, at 325, once all paths are determined, the method automatically triggers generating a Lesson Plan. That is, using a sequence and time estimates a plan is generated for the candidate resource and the process continues to step 330, FIG. 9B where the generated lesson plan results are forwarded to the software architect.

In a further embodiment, candidate developers may be ranked through a social analysis where candidates are ranked by relationships discovered by analyzing public or private social networks (e.g., Facebook, LinkedIn, etc.). For example, candidates of people with greater skills may be ranked higher than those candidates with less skills. That is, the system ranks candidates by relationships discovered with social analysis as described herein below with respect to FIG. 11.

Figure 11:
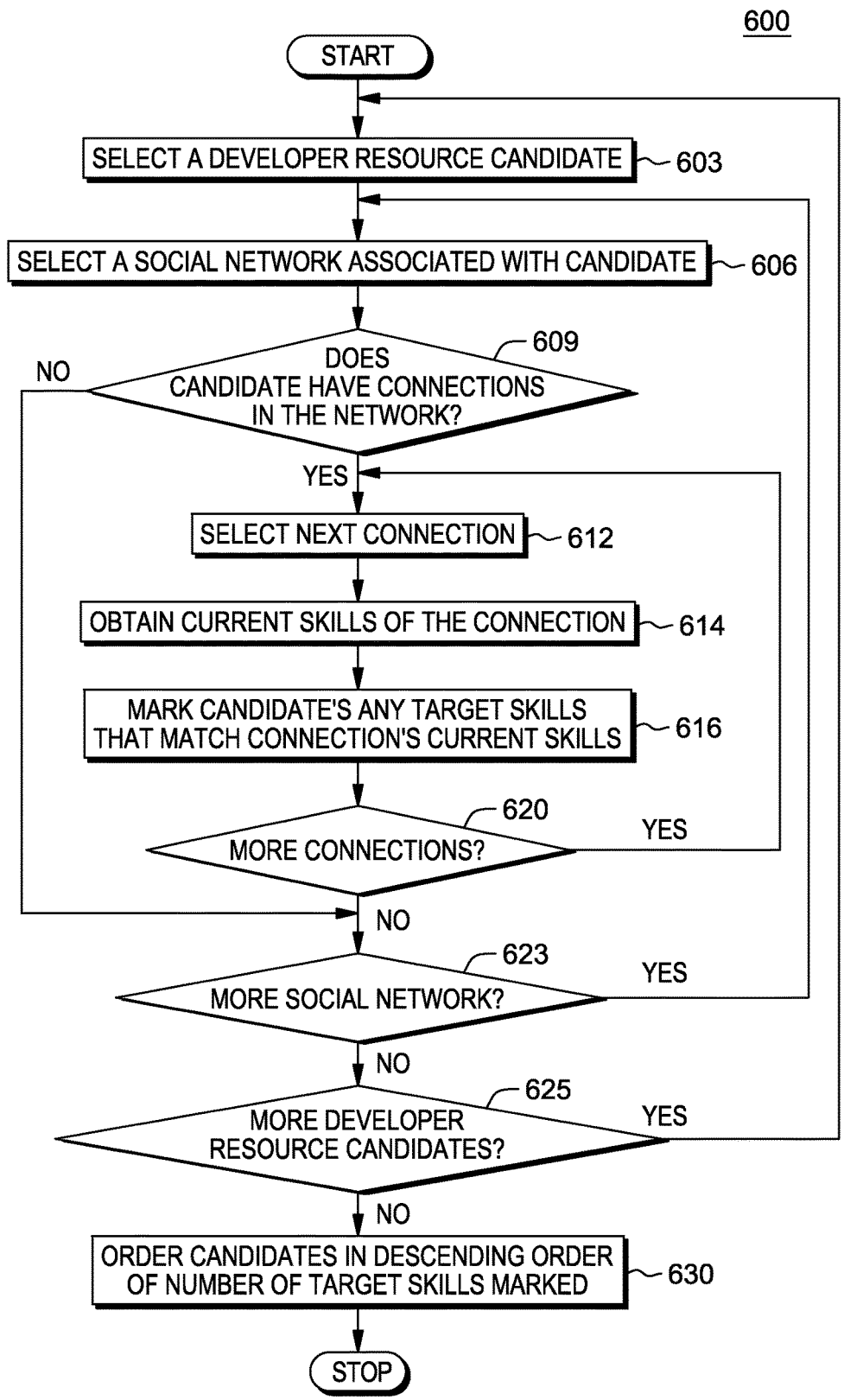
FIG. 11 shows a method for automatically ranking a candidate through social analysis in one embodiment.

FIG. 11 shows a method for automatically ranking a candidate developer resource by conducting a social analysis in one embodiment. In one embodiment, the system 10" of FIG. 8 implements the candidate analytic processor 13 and candidate selection processor 15 to perform the method 600 of FIG. 11. At step 603, a candidate developer resource is selected out of the available candidates. Then, at 606, a social network is selected for that candidate developer. Such social networks may include, but are not limited to: MySpace, Facebook, LinkedIn, Microsoft, Flickr, YouTube, IBM Connections, Yammer, Path, Google Circles, Diaspora, Social.Go, etc. Then, at 609, an automatic determination is made based on searching the social network whether the selected candidate developer has contacts or connections in the selected network. Then, if a connection is found, the connection is selected at 612 and any current skills the selected connection possess is obtained for that selected connection at 614. Then, at 616, there is determined whether any candidate's target/needed skills matches any of the obtained current skills of the selected connection and these skills are recorded or marked in a memory storage device. Continuing, at step 620, a decision is made as to whether there are any more connections for the selected candidate. If there is any other connection determined for that candidate the process returns to step 612 to select that next connection and perform steps 614, 616 to record any current skills obtained for the selected connection match the needed or target skills of the candidate developer. Otherwise, at 620, if it is determined that no further connections exist, then the process continues to 623 to determine if there are any further social networks associated with the selected candidate developer resource.

Returning to 609, FIG. 11, if it is determined that the selected candidate developer has no contacts or connections in the selected network, then the process will proceed to 623, for the determining whether there is any further social networks associated with the candidate developer.

At 623, if it is determined that there is a further social network associated with the candidate developer, then the process returns to 606 to select that network, and perform steps 609 through 620 to mark or record in memory any current skills obtained for a selected connection that matches the needed or target skills of the candidate developer. Otherwise, at 623, if it is determined that there are no more social contacts or connections and no more social networks associated with the current selected developer resource, then the process continues at step 625 to determine whether there is any further developer resource candidates. If at 625 it is determined that there are further developer resource candidates, the process returns to step 603 to select the next candidate developer resource, and the process steps 606 through 623 are repeated for the newly selected developer resource candidate. Otherwise, at 625, if it is determined that there are no further developer resource candidates identified, then the process proceeds to step 630 to order the candidate developer resources, for example, in a descending order, based on the number of target skills marked or recorded and the ranking process 600 terminates.

Thus, for example, if candidate A and B have an equal number of skills "gaps" discovered but candidate A has several people in his network familiar with skills that developer is lacking, that candidate may be ranked ahead of candidate B who does not have a social network with those skills. Candidate A receives a higher ranking because it will be easier for him to close those skill gaps by leaning on or consulting with members of his social network as he addresses them through education or other means. The social network may be a public or private social network.

Lesson Plan Generation

Lessons for each transition within each path are collected and sequenced. Using sequence and the time estimates a plan is generated for candidate. If an architect supplied time is available to close the gap, and total time estimate for generating and administering a lesson plan for that candidate exceeds the supplied time, the candidate may be rejected. If all available candidate development resources are rejected due to lack of skills, the software architect is notified to renegotiate the project plan.

Thus, in one embodiment, as shown in FIG. 9B, step 333 after forwarding the generated lesson plan results to the software architect, the architect will determine and provide a measure of the available time to close gaps to the method. For example, as the "gap" is the difference between the current and the target (needed) skills of a developer, a lesson plan may include learning materials that the developer takes to close that gap. The learning material is a collection of courses, with each course having a time associated with it, e.g., a Course 1 (32 hours), a Course 2 (20 hours), etc. The architect determines the amount of time available for the developer to attain target skills. This time, in one instance, may come from the project plan. Thus, for example, the time available to close the gap is 40 hours but the two courses together takes 52 hours.

Then, at 335, a determination or analysis is made as to the provided time estimated to administer the generated lesson plan for that skill(s) against the total available time. Then, at 340, a determination is made as to whether the total estimated time exceeds the architect determined available time. If the total estimated time exceeds the total available time, then the process returns to step 309, FIG. 9A where a further skills gap analysis is performed (e.g., to re-evaluate/modify the skills gap for that candidate) and the process repeats. For example, the method may rerun gap analysis using an alternate optimization method. Otherwise, if the total estimated time for lesson plan generating/administering in the path does not exceed the total available time, then the process continues at 345 where a determination is made as to whether the skills "gap" can be closed, i.e., given the estimated time versus the available time. If it is determinable at 345 that the skills "gap" can be closed given the estimated time then the process proceeds to step 350, FIG. 9B, where that candidate is selected as the developer resource. Further, at 355, there is depicted the development resource reaching a skill in the path upon which achieving the skill the method triggers a further evaluation of that selected candidate. The process then proceeds to step 380, FIG. 9C, where, for dynamic adjustment of the plan, as the candidate reaches each skill in the path, the system and methods evaluate the candidate using objective tests. If scoring at a higher level than previously, the method regenerates a lesson plan using the new level.

Thus, at step 380, FIG. 9C, there is made a determination as to whether the selected candidate achieves a higher level score as the candidate reaches each skill in the path. If the candidate can achieve a higher score, representing a higher level skill, this would close the skills gap and lesson plan generation may be triggered for that candidate's new skill level as indicated at 390. Then the method ends at 399. Otherwise, at 380, if it is determined that the selected candidate skill level has not improved based on the objective tests taken, and does not achieve a higher level score, the process proceeds to 395 where the Lesson Plan Generation method forcing the candidate, if the candidate has scored much lower, to redo lessons that would transition to that skill, and the method ends at 399.

Returning to step 345, FIG. 9B, if it is determinable at 345 that the skills gap cannot be closed, the process proceeds to step 360 where that candidate development resource is not selected (rejected). Then, at 365, FIG. 9B, a search is triggered to find another project where the rejected candidate development resource skills match. Continuing at 370, a determination is made as to whether the determined skills match skills required of a developer resource on another project. If the skills do not match, then the method ends at 399 and if all available candidate development resources are rejected due to lack of skills, an architect is notified to renegotiate the project plan. However, if the skills do match, then that developer resource is set as a candidate for the new project at 375 and may be further evaluated at subsequent steps.

Advantageously, the aspects of this method's teachings include but are not limited to:
(1) automatic gap analysis that provides an objective method to match skills against needs;
(2) central lesson plans provides a collaborative environment to maintain effective lessons;
(3) reduced technical team overhead; and (4) efficient staffing.

In one embodiment, for the characterization of necessary skills/resources: the system and methods herein may automatically characterize the necessary skill and/or resource using a variety of methods including but not limited to:

(1) Static Code Analysis—Known methods such as static code analysis may be used to detect the type of skill necessary. For example, static analysis can detect when a code module is performing data layer access (JDBC, JPA, etc), network access (HTTP/TCP/etc) or types of development. Static analysis tools already group systems types as they locate bugs, so they may be easily extended to group code by type.

(2) User Selection—As the user is defining the module they may select the type during definition. This may be an enumeration of a fixed set of high level types or may provide free form tagging; and (3) Application Lifecycle Management—The ALM tool may require the user to select type when defining the story, task or defect prior to assignment or code check-in.

It should be noted the system and methods herein may be applied to methods beyond UML or any modeling language. Furthermore, it should be noted that these methods may be applied during any phase—not just initial development.

Lastly, it should be noted that the system and methods herein may be applicable to all types of development methodologies including but not limited to: waterfall, scrum, and extreme programming.

Figure 12:
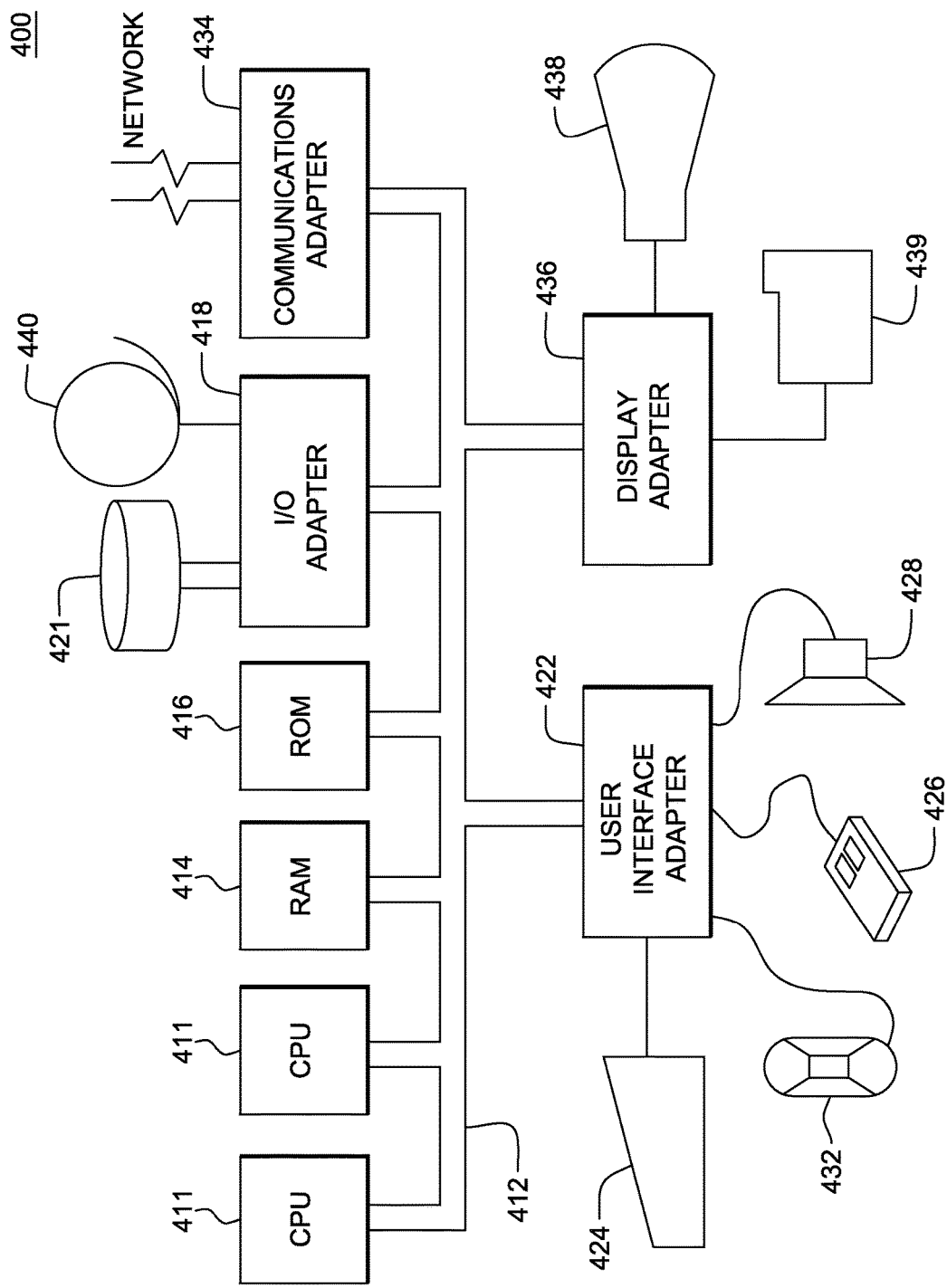
FIG. 12 illustrates an exemplary hardware configuration of a computing system infrastructure 400 in which the present methods are run.

FIG. 12 illustrates an exemplary hardware configuration of a computing system infrastructure 400 in which the present methods may be run. In one aspect, computing system 400 is a depiction of and includes the system 10 of FIG. 1 programmed to perform the method processing steps of FIGS. 2A-2B, the system 10' of FIG. 5, e.g., programmed to perform the method processing steps of FIGS. 7A-7B, and the system of FIG. 8, e.g., programmed to perform the method processing steps of FIGS. 9A-9C. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, disk drive device 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

The invention claimed is:

1. A computer program product for selecting resources for a software development project during its design, the computer program product comprising a storage medium, said storage medium not a propagating signal, said medium readable by a processing circuit and storing instructions run by the processing circuit for performing a method, the method comprising:
   automatically detecting a change in a software architecture model being built, said detected change comprising one of: an addition of a new element or a change to an existing element of said software architecture model, said method further comprising:
   evaluating, upon said detection, each detected change against a currently assigned resource skill set for resources used in developing said software architecture model, and
   one or more of:
   automatically determining an existing developer resource candidate currently associated with said project to take on additional work upon evaluating an addition or update of an element in the software architecture model; or
   automatically locating a new developer resource candidate to add if no existing developer resource can take on said additional work, and
   automatically determining an availability of said new candidate developer candidate or existing developer resource, and for any available candidate developer resource being added or currently associated with said project:
     automatically determining a deficiency in a skill or skills set required for said developer resource candidate to work on one of: said new element being added or said existing element being changed; and
     automatically generating a lesson plan for said developer resource candidate to obtain said skill or skills set that are determined deficient.

2. The computer program product of claim 1, wherein to automatically detect a change in the software architecture model, said method further comprises:
   automatically checking a first repository including version histories of existing software development projects to determine if a new element has already been developed in a prior released version of said UML model design; and
   automatically checking a second repository including reusable components to determine if a new element has already been developed for a different project and is to be reused in the software architecture model being designed; and one of:
   automatically finding, in said first repository, a developer resource candidate who worked on that prior released element, if determined that said new element has already been developed in said prior released version, or automatically finding, in said second repository, an original author of the element as a developer resource candidate if determined that said new element is an update to an element previously developed for a different project.

3. The computer program product of claim 2, wherein said method further comprises:

automatically determining whether said developer resource candidate is available for assignment to work on the element for the software architecture model; and if said developer is available, assigning said developer resource candidate to work on said new element; or if said developer is not available, automatically determining a further developer resource candidate for said assignment.

4. The computer program product of claim 1, wherein said automatically generating a lesson plan for said developer resource candidate comprises:

automatically determining said skill or skills set needed for said developer resource candidate to work on said development project;

representing one or more needed skills as target nodes of a directed graph having source nodes and said target nodes interconnected by edges;

determining said current skills of one or more developer resource candidates determined available for said software development project;

representing available skills as source nodes in said directed graph, each said source node and target node representing a specific skill and an associated skill level, wherein an interconnecting edge represents a skills transition, said skills transition having one or more lessons associated therewith, wherein for each developer resource candidate, said hardware processor is further configured to:

automatically identifying from said directed graph a gap between a current available skill of a source node and a needed skill of a target node, said gap representing said skill or skills set deficiency.

5. The computer program product of claim 4, wherein to automatically generate a lesson plan for said developer resource candidate, said method further comprises:

determining, for each gap, a path through said directed graph connecting a current skill/target skill pair;

collecting each skills transition edge within each said path; and sequencing said one or more associated lessons of said collected skills transition edges to generate said lesson plan.

6. The computer program product as claimed in claim 3, wherein to automatically determine a further developer resource candidate for said assignment, said method further comprises:

finding one or more potential developer resource candidates having a current availability status determined as not currently working, or having a limited assigned backlog of work; and automatically communicating a test to the found one or more developer resource candidates, said test based on subject matter inferred by the detected change in said software architecture model;

obtaining scores of said test for each said one or more developer resource candidates; and selecting a developer resource candidate based on said test scores.

7. The computer program product as claimed in claim 1, wherein when said detected change comprises one of: an addition of a new element or a change to an existing element of said software architecture model, to evaluate said determined skill set of developer resources associated with said the each detected change against a skill-set of available developer resources currently associated with said development project, said method further comprises:

automatically determining whether a skill set of said developer resource associated with a change exactly matches a skill-set of available currently associated developer resources; and if an exact match is determined:

automatically determining an availability of said matching developer resource to take on said assignment; or automatically determining whether a skill set of said developer resource associated with a change partially matches a skill-set of available currently associated developer resources; and if a partial match is determined:

refining the change or update associated with the software architecture model; and determining, for each refined change, a skill set of developer resources associated with the change; and evaluating said determined skill set of developer resources associated with the each refined change against a skill-set of available developer resources currently associated with said development project.

8. The computer program product as claimed in claim 3, wherein responsive to a detected change, multiple developer resource candidates are determined, said method further comprises:

automatically ranking said candidate developer resources according to a criteria, said criteria comprising:

a determined amount of colleagues or contacts associated with a candidate developer resource by implementing a social network analysis for that candidate developer resource, and a determination of whether one or more said associated colleagues or contacts have a familiarity with a target skill or skill set lacking in the candidate developer resource as determined by implementing said social network analysis.

9. The computer program product as claimed in claim 4, wherein for a selected candidate developer resource, said method further comprises:

automatically closing said determined skills gap by:

determining a candidate developer resource reaching a new skill in the path;

triggering an objective test for said candidate developer resource reaching a new skill in the path taken;

determining, based on said objective test taken at said path, whether said candidate developer resource achieves an increased level score representing a higher level skill; and automatically generating a lesson plan for that candidate resource's new skill level;

otherwise, if it is determined that the candidate resource's skill level has not improved based on the objective tests taken, requiring said candidate developer resource to redo lessons to enable a transitioning to that skill.

10. A system for selecting resources for building a software development project during its design, the system comprising:
   a memory storage device;
   a hardware processor in communication with said memory storage device and configured to:
   automatically detect a change in a software architecture model being built, said detected change comprising one of: an addition of a new element or a change to an existing element of said software architecture model, and
   evaluate, upon said detection, each detected change against a currently assigned resource skill set for resources used in developing said software architecture model, and
   one or more of:
   automatically determine an existing developer resource candidate to take on additional work upon evaluating an addition or update of an element in the software architecture model; or
   automatically locate a new developer resource if no existing developer resource can take on said additional work, and wherein said hardware processor is further configured to:
   automatically determine an availability of said developer resource candidate, and for any available candidate developer resource being added or currently associated with said project:
      automatically determine a deficiency in a skill or skills set required for said developer resource candidate to work on one of: said new element being added or said existing element being changed; and
      automatically generate a lesson plan for said developer resource candidate to obtain said skill or skills set that are determined deficient.

11. The system of claim 10, wherein to automatically detect a change in the software architecture model, said hardware processor is further configured to:
   automatically check a first repository including version histories of existing software development projects to determine if a new element has already been developed in a prior released version of a software architecture model design; and
   automatically check a second repository including reusable components to determine if a new element has already been developed for a different project and can be reused in the software architecture model being designed; and one of:
      automatically find, in said first repository, the developer resource candidate who worked on that prior released element, if determined that said new element has already been developed in said prior released version, or
      automatically find, in said second repository, an original author of the element as a developer resource candidate if determined that said new element is an update to an element previously developed for a different project.

12. The system of claim 10, wherein said hardware processor is further configured to:
   automatically determine whether said existing or new developer resource candidate is available for assignment to work on the element for the software architecture model; and
   if said existing developer is available,
      assign said existing developer resource candidate to work on said new element; or
   if said existing developer is not available,
      automatically determine the new developer resource candidate for said assignment.

13. The system of claim 10, wherein to automatically generate a lesson plan for said developer resource candidate, said hardware processor is further configure to:
   automatically determine said skill or skills set needed for said developer resource candidate to work on said development project;
   represent one or more needed skills as target nodes of a directed graph having source nodes and said target nodes interconnected by edges;
   determine said current skills of one or more developer resource candidates determined available for said software development project;
   represent available skills as source nodes in said directed graph, each said source node and target node representing a specific skill and an associated skill level, an interconnecting edge representing a skills transition, said skills transition having one or more lessons associated therewith, wherein for each developer resource candidate:
      automatically identify from said directed graph a gap between a current available skill of a source node and a needed skill of a target node, said gap representing said skill or skills set deficiency.

14. The system of claim 13, wherein to automatically generate a lesson plan for said developer resource candidate, said hardware processor is further configured to:
   for each gap, determine a path through said directed graph connecting a current skill/target skill pair;
   collect each skills transition edge within each said path; and
   sequence said one or more associated lessons of said collected skills transition edges to generate said lesson plan.

15. The system as claimed in claim 12, wherein to automatically determine a new developer resource candidate for said assignment, said hardware processor is further configured to:
   find one or more potential developer resource candidates having a current availability status determined as not currently working, or having a limited assigned backlog of work; and
   automatically communicate a test to the found one or more new developer resource candidates, said test based on subject matter inferred by the detected change in said software architecture model;
   obtain scores of said test for each said one or more developer resource candidates; and
   select a developer resource candidate based on said test scores.

16. The system as claimed in claim 10, wherein when said detected change comprises one of: an addition of a new element or a change to an existing element of said software architecture model, said evaluating said determined skill set of developer resources associated with said the each detected change against a skill-set of available developer resources currently associated with said development project by said hardware processor comprises one of:
   automatically determining whether a skill set of said developer resource associated with a change exactly matches a skill-set of available currently associated developer resources; and if an exact match is determined:

automatically determining an availability of said matching developer resource to take on said assignment; or automatically determining whether a skill set of said developer resource associated with a change partially matches a skill-set of available currently associated developer resources; and if a partial match is determined:
refining the change or update associated with the software architecture model; and
determining, for each refined change, a skill set of developer resources associated with the change; and
evaluating said determined skill set of developer resources associated with the each refined change against a skill-set of available developer resources currently associated with said development project.

17. The system as claimed in claim 12, wherein responsive to a detected change, multiple developer resource candidates are determined, said hardware processor further configured to:
automatically rank said candidate developer resources according to a criteria, said criteria comprising:
a determined amount of colleagues or contacts associated with a candidate developer resource by implementing a social network analysis for that candidate developer resource, and
a determination whether one or more said associated colleagues or contacts have a familiarity with a skill or skill set lacking in the candidate developer resource as determined by implementing said social network analysis.

18. The system as claimed in claim 13, wherein said hardware processor is further configured to:
for a selected candidate, automatically close said determined skills gap by:
determining a candidate developer resource reaching a new skill in the path;
triggering an objective test for said candidate developer resource reaching a new skill in the path taken;
determining, based on said objective test taken at said path, whether said candidate developer resource achieves an increased level score representing a higher level skill; and
automatically generating a lesson plan for that candidate resource's new skill level; and
otherwise, if it is determined that the candidate resource's skill level has not improved based on the objective tests taken,
requiring said candidate developer resource to redo lessons to enable a transitioning to that skill.

19. The computer program product as claimed in claim 1, wherein a detected change in the software architecture model being built includes a deletion of an element in the software architecture model, said method further comprising:
automatically determining a developer resource candidate of developer resources currently associated with said project to be removed upon evaluating a deletion of an element in the software architecture model.

20. The system as claimed in claim 10, wherein a detected change in the software architecture model being built includes a deletion of an element in the software architecture model, said method further comprising:
automatically determining a developer resource candidate of developer resources currently associated with said project to be removed upon evaluating a deletion of an element in the software architecture model.

\* \* \* \* \*